(12) United States Patent
Echigo et al.

(10) Patent No.: US 12,529,151 B2
(45) Date of Patent: Jan. 20, 2026

(54) ELECTROLYSIS CELL UNIT, ELECTROLYSIS CELL DEVICE, HYDROCARBON PRODUCTION SYSTEM, AND PRODUCTION METHOD AND USE METHOD OF ELECTROLYSIS CELL UNIT

(71) Applicant: Osaka Gas Co., Ltd., Osaka (JP)

(72) Inventors: Mitsuaki Echigo, Osaka (JP); Hisao Ohnishi, Osaka (JP); Yuji Tsuda, Osaka (JP)

(73) Assignee: Osaka Gas Co., Ltd., Osaka (JP)

(*) Notice: Subject to any disclaimer, the term of this patent is extended or adjusted under 35 U.S.C. 154(b) by 641 days.

(21) Appl. No.: 17/914,176

(22) PCT Filed: Mar. 31, 2021

(86) PCT No.: PCT/JP2021/014084
§ 371 (c)(1),
(2) Date: Sep. 23, 2022

(87) PCT Pub. No.: WO2021/201193
PCT Pub. Date: Oct. 7, 2021

(65) Prior Publication Data
US 2023/0160079 A1    May 25, 2023

(30) Foreign Application Priority Data
Mar. 31, 2020    (JP) ................ 2020-065258

(51) Int. Cl.
*C25B 3/03* (2021.01)
*C01B 32/40* (2017.01)
(Continued)

(52) U.S. Cl.
CPC ............ *C25B 3/03* (2021.01); *C01B 32/40* (2017.08); *C25B 1/04* (2013.01); *C25B 1/23* (2021.01);
(Continued)

(58) Field of Classification Search
CPC .................................. C25B 15/081
See application file for complete search history.

(56) References Cited

U.S. PATENT DOCUMENTS

| 2006/0211777 A1 | 9/2006 | Severinsky |
| 2007/0149392 A1 | 6/2007 | Ku et al. |

(Continued)

FOREIGN PATENT DOCUMENTS

| CN | 101160375 A | 4/2008 |
| EP | 0291857 A2 | 11/1988 |

(Continued)

OTHER PUBLICATIONS

Machine translation of KR-20120105930-A (Year: 2012).*
(Continued)

*Primary Examiner* — Brian W Cohen
(74) *Attorney, Agent, or Firm* — The Webb Law Firm

(57) ABSTRACT

An electrolysis cell unit capable of efficiently electrolyzing water and carbon dioxide is obtained. An electrolysis cell unit includes at least an electrolysis cell in which an electrode layer and a counter electrode layer are formed with an electrolyte layer interposed therebetween and a discharge path for discharging hydrogen generated in the electrode layer, in which the electrolysis cell being formed in a thin layer on a support and a reverse water-gas shift reaction unit that generates carbon monoxide using carbon dioxide and the hydrogen by a reverse water-gas shift reaction being provided in at least a portion of the discharge path.

12 Claims, 7 Drawing Sheets

(51) Int. Cl.
*C25B 1/04* (2021.01)
*C25B 1/23* (2021.01)
*C25B 9/19* (2021.01)
*C25B 11/067* (2021.01)
*C25B 11/081* (2021.01)
*C25B 13/05* (2021.01)
*C25B 15/021* (2021.01)
*C25B 15/08* (2006.01)

(52) U.S. Cl.
CPC .............. *C25B 9/19* (2021.01); *C25B 11/067* (2021.01); *C25B 11/081* (2021.01); *C25B 13/05* (2021.01); *C25B 15/021* (2021.01); *C25B 15/081* (2021.01)

(56) References Cited

U.S. PATENT DOCUMENTS

| | | |
|---|---|---|
| 2011/0105630 A1 | 5/2011 | Dorner et al. |
| 2013/0105330 A1* | 5/2013 | Teamey ................ C25B 13/08 205/349 |
| 2016/0053388 A1 | 2/2016 | Reytier et al. |
| 2018/0257057 A1 | 9/2018 | Motoshige et al. |
| 2018/0265994 A1 | 9/2018 | Yamagiwa et al. |
| 2019/0194816 A1 | 6/2019 | Brunot et al. |
| 2020/0002821 A1 | 1/2020 | Ono et al. |
| 2020/0017985 A1 | 1/2020 | Yamagiwa et al. |
| 2020/0114338 A1* | 4/2020 | Masuda .................. B01J 29/46 |
| 2021/0119228 A1 | 4/2021 | Echigo et al. |
| 2021/0119239 A1 | 4/2021 | Echigo et al. |
| 2021/0151774 A1 | 5/2021 | Echigo et al. |

FOREIGN PATENT DOCUMENTS

| | | |
|---|---|---|
| EP | 1861478 B1 | 2/2012 |
| JP | H63297209 A | 12/1988 |
| JP | 2016522166 A | 7/2016 |
| JP | 2018150254 A | 9/2018 |
| JP | 2018154865 A | 10/2018 |
| JP | 2018156914 A | 10/2018 |
| JP | 2019112717 A | 7/2019 |
| JP | 2019163520 A | 9/2019 |
| JP | 2019167556 A | 10/2019 |
| JP | 2019173108 A | 10/2019 |
| KR | 20120105930 A | 9/2012 |
| WO | 2019189912 A1 | 3/2019 |
| WO | 2019189913 A1 | 3/2019 |
| WO | 2019189914 A1 | 10/2019 |

OTHER PUBLICATIONS

Office Action issued in JP2021160944 on Apr. 21, 2025.
Extended European Search Report issued in EP21778714.2 on Feb. 10, 2025.
Office Action issued in CN202180025205.3 on Dec. 26, 2024.

* cited by examiner

ELECTROLYSIS CELL UNIT, ELECTROLYSIS CELL DEVICE, HYDROCARBON PRODUCTION SYSTEM, AND PRODUCTION METHOD AND USE METHOD OF ELECTROLYSIS CELL UNIT

CROSS-REFERENCE TO RELATED APPLICATIONS

This application is the United States national phase of International Application No. PCT/JP2021/014084 filed Mar. 31, 2021, and claims priority to Japanese Patent Application No. 2021-065258 filed Mar. 31, 2020, the disclosures of which are hereby incorporated by reference in their entirety.

BACKGROUND OF THE INVENTION

Field of the Invention

The present invention relates to an electrolysis cell unit including an electrolysis cell configured to include an electrode layer and a counter electrode layer with an electrolyte layer interposed therebetween, a method for producing or using the electrolysis cell unit, and an electrolysis cell device configured to include the electrolysis cell unit, and relates to a hydrocarbon production system configured to include this type of electrolysis cell device.

This type of hydrocarbon production system is configured as a system that produces hydrocarbons from at least water and carbon monoxide, and the electrolysis cell device including the electrolysis cell unit serves for electrolysis (electrolyzation) of a hydrogen source (typically water), and electrolysis (electrolyzation) of a carbon monoxide source (typically carbon dioxide).

Description of Related Art

This type of hydrocarbon production system is disclosed in JP-T-2016-522166 and JP-A-2019-112717.

The system disclosed in JP-T-2016-522166 includes a high temperature electrolyte (HTE) reactor (corresponding to electrolysis reaction unit of the present invention) including stacking of electrolysis single cells (corresponding to the electrolysis cell unit of the present invention) that generate either hydrogen or a synthetic raw material gas ("synthetic gas" representing a mixture of hydrogen and carbon monoxide) from steam and carbon dioxide, in which the synthetic gas obtained in this electrolysis single cell is converted into a desired combustible gas by a heterogeneous catalytic action.

Therefore, in the technique disclosed in JP-T-2016-522166, a hydrocarbon synthesis unit is provided on the downstream side of the electrolysis reaction unit, and hydrocarbons are produced using water and carbon dioxide as starting materials.

Referring to FIG. 3 of JP-T-2016-522166, this system is a large cylindrical device.

Meanwhile, a technique disclosed in JP-A-2019-112717 relates to a power-to-gas unit that generates a useful gas (specifically, methane) from electric power, specifically, a technique is disclosed in which a methanation reaction catalyst material is contained in a cathode of a stack of a solid oxide (SOEC) basic electrolysis cell.

Also in the technique disclosed in JP-A-2019-112717, the electrolysis cell serves as the electrolysis reaction unit, and the methanation reaction catalyst material provided on the cathode constitutes the hydrocarbon synthesis unit.

In the related arts, in the electrolysis reaction unit, so-called "co-electrolysis" is carried out in which both water and carbon dioxide are electrolyzed together. A heterogeneous catalyst is used for synthesis (so-called methanation) of hydrocarbons.

However, the following problems regarding co-electrolysis in the electrolysis reaction unit and hydrocarbon synthesis in the hydrocarbon synthesis unit have been found.

1. Problems of Co-Electrolysis

Since an electrolysis voltage of water is around 1.23 V, while an electrolysis voltage of carbon dioxide is around 1.33 V, the electrolysis reaction of carbon dioxide is less likely to occur than the electrolysis reaction of water. As a result, even when the co-electrolysis reaction is attempted, the electrolysis reaction of carbon dioxide is unlikely to occur, and the concentration of carbon monoxide required for hydrocarbon synthesis cannot be sufficiently secured.

2. Problems in Hydrocarbon Synthesis

Although it is said that a heterogeneous catalyst is used, it is difficult to select this kind of catalyst, and a technique capable of stably synthesizing hydrocarbon has not yet been established.

3. Further, referring to the device described in JP-T-2016-522166, the device is large in size, and there is room for improvement in that hydrocarbon synthesis is efficiently performed without consuming special energy.

SUMMARY OF THE INVENTION

In view of this situation, a main object of the present invention is to obtain a hydrocarbon production system capable of appropriately securing hydrogen and carbon monoxide necessary for hydrocarbon synthesis, for example, in an electrolysis cell unit of a gas serving as a hydrogen source or a carbon monoxide source, and producing hydrocarbon using hydrogen and carbon monoxide generated in the above.

In a first characteristic configuration of an electrolysis cell unit according to the present invention, there is provided an electrolysis cell unit including at least: an electrolysis cell in which an electrode layer and a counter electrode layer are formed with an electrolyte layer interposed therebetween; and a discharge path for discharging hydrogen generated in the electrode layer, in which the electrolysis cell is formed in a thin layer on a support and a reverse water-gas shift reaction unit that generates carbon monoxide using carbon dioxide and the hydrogen by a reverse water-gas shift reaction is provided in at least a portion of the discharge path.

This electrolysis cell unit includes the electrolysis cell, and when a current flows between the electrode layer and the counter electrode layer of the electrolysis cell, hydrogen is generated by an electrolysis reaction from a gas that is a hydrogen source. The generated hydrogen is released to the discharge path, but by making at least a portion of this discharge path the reverse water-gas shift reaction unit, it is possible to generate carbon monoxide using carbon dioxide flowing through the discharge path and hydrogen generated in the electrode layer. In this electrolysis cell unit, since a functional part as the electrolysis reaction unit and a functional part as the reverse water-gas shift reaction unit are configured as separate parts (the former is the electrolysis cell and the latter is the discharge path), by using an optimum material for each part and maintaining an appropriate temperature environment, as a result, carbon dioxide that cannot be sufficiently decomposed in the electrolysis reaction unit can be converted into carbon monoxide in the reverse water-gas shift reaction unit. Further, such an electrolysis reaction and a reverse water-gas shift reaction can be carried out in a single electrolysis cell unit. As will be described later, both reactions require relatively high temperatures, and thus, it is preferable to keep them in a single unit.

Further, the electrolysis cell according to the present invention is formed on the support in the form of a thin film, and thus, the electrolysis cell has a robust structure and yet exhibits sufficient capacity with high efficiency. In this respect, by making the electrolysis cell into a thin film, it is possible to suppress the internal resistance of the electrolysis cell and realize a high-performance electrolysis cell, and at the same time, reduce the amount of expensive cell material used and reduce the cost of the electrolysis cell.

In a second characteristic configuration of the present invention, the support is a metal.

By adopting a metal as the support, a material cost is suppressed by ensuring the strength with an inexpensive metal material, and workability is higher than that of ceramics, so that shape selectivity is high.

In a third characteristic configuration of the present invention,
a plurality of through holes penetrating the support are provided, the electrode layer is provided on one surface of the support, the discharge path is provided along the other surface thereof, and the reverse water-gas shift reaction unit is provided in at least a portion of an inner surface of the discharge path.

According to this characteristic configuration, the electrode layer can be provided on one surface of the support to realize hydrogen generation. The hydrogen generated in this way is guided from the electrode layer to the discharge path through the plurality of through holes and causes a good reaction in the reverse water-gas shift reaction unit provided in at least a portion of the discharge path, and when carbon dioxide is supplied, at least carbon monoxide can be generated.

In a fourth characteristic configuration of the present invention,
the reverse water-gas shift reaction unit is provided in at least a portion of an inside of the through hole.

According to this characteristic configuration, at least a portion of the through hole also functions as the reverse water-gas shift reaction unit.

In a fifth characteristic configuration of the present invention,
the reverse water-gas shift reaction unit is provided on a surface of the support different from a surface on which the electrolysis cell is formed.

According to this characteristic configuration, a function can be obtained as the reverse water-gas shift reaction unit on a different surface (for example, a surface opposite to the surface on which the electrolysis cell is formed) of the support.

In a sixth characteristic configuration of the present invention,
the electrolysis cell unit further includes a separator that separates hydrogen generated in the electrode layer and oxygen generated in the counter electrode layer, in which the reverse water-gas shift reaction unit is provided in at least a portion of the separator on a discharge path side of the hydrogen.

According to this characteristic configuration, when an electrolysis cell undergoes an electrolysis reaction, hydrogen is generated from the electrode layer and oxygen is generated from the counter electrode layer, but by providing the separator, the reverse water-gas shift reaction can be caused by using hydrogen and accompanying carbon dioxide in the reverse water-gas shift reaction unit.

In a seventh characteristic configuration of the present invention, the separator is a metal.

By adopting a metal as a separator, it is possible to suppress the material cost by ensuring gas separability with an inexpensive metal material. In addition, the metal is more workable than ceramics and has high shape selectivity.

In an eighth characteristic configuration of the present invention,
a reverse water-gas shift catalyst contained in the reverse water-gas shift reaction unit is a catalyst in which a metal or a metal oxide is supported on a carrier.

According to this characteristic configuration, the reverse water-gas shift reaction can be caused by the catalyst in which a metal or a metal oxide is supported on the carrier.

In a ninth characteristic configuration of the present invention,
a reverse water-gas shift catalyst contained in the reverse water-gas shift reaction unit is a catalyst containing at least one of platinum, nickel, and iron.

According to this characteristic configuration, it is possible to obtain a highly active reverse water-gas shift performance as described later.

In a tenth characteristic configuration of the present invention,
the carrier is a carrier containing a ceria-based metal oxide or a zirconia-based metal oxide as a main component.

According to this characteristic configuration, as will be described later, a highly active reverse water-gas shift performance can be obtained, and catalytic ability and durability can be obtained in a high-temperature environment required for a reverse water-gas shift reaction. Further, when the carrier is the carrier containing a ceria-based metal oxide or a zirconia-based metal oxide as a main component, a thermal expansion coefficient of the carrier can be close to that of a material used for a constituent material of the electrolysis cell or the support, so that the temperature is low. Accordingly, the electrolysis cell unit is not easily damaged even when a low temperature cycle and a high temperature cycle are repeated, and the electrolysis cell unit having excellent reliability and durability can be realized.

When obtaining the reverse water-gas shift catalyst, it is preferable to have at least a calcination step of performing calcination at a temperature of 450° C. or higher.

When the reverse water-gas shift catalyst is used, in order to cause a desired reverse water-gas shift reaction, it is necessary to set the reaction temperature range to a relatively high temperature range, but when the catalyst is obtained by calcination in this temperature range, the catalyst can be used stably. The temperature is preferably 450° C. or higher, but more preferably 600° C. or higher and 800° C. or higher because stability in a high temperature range can be improved. For example, the catalyst can be used stably even when combined with a solid oxide type electrolysis cell used in a relatively high temperature range (for example, 600° C. to 800° C.). Further, when the calcination temperature is set too high, a cost required for the calcination step becomes too high, and thus, an upper limit is about 1200° C.

When using a reverse water-gas shift catalyst, it is preferable that the reverse water-gas shift catalyst is subjected to a reduction pretreatment and then subjected to a reaction.

In many cases, at least a portion of the catalytically active component contained in the reverse water-gas shift catalyst is a metal oxide in the calcination step, but the reduction pretreatment (a treatment for performing a reduction treatment before use) is performed, and thus, the catalytically active component in an oxidized state is reduced and catalytic activity can be satisfactorily exhibited.

In a characteristic configuration of an electrolysis cell device according to the present invention,
there is provided an electrolysis cell device including at least: the electrolysis cell unit described above; an electrolysis raw material supply unit that supplies water and/or steam and carbon dioxide to the electrolysis cell unit; and a power supply unit that supplies electric power.

According to this characteristic configuration, an electrolysis raw material can be supplied from the electrolysis raw material supply unit to the electrolysis cell unit, electric power can be supplied from the power supply unit to the electrolysis cell, and thus, the electrolysis raw material can be electrolyzed by the electric power.

Here, for example, when the electrolysis raw material is water, hydrogen can be generated by the electrolysis, and when the electrolysis raw material is carbon dioxide, carbon monoxide is generated by the electrolysis. Further, in the electrolysis cell unit of the present invention, since the reverse water-gas shift reaction unit that generates carbon monoxide by using carbon dioxide and the hydrogen by the reverse water-gas shift reaction is provided in at least a portion of the discharge path, carbon monoxide can also be generated by the reaction in the discharge path.

In a characteristic configuration of a hydrocarbon production system according to the present invention,
there is provided a hydrocarbon production system including the electrolysis cell unit or the electrolysis cell device described above; and a hydrocarbon synthesis reaction unit that generates a hydrocarbon by at least reacting the hydrogen with the carbon monoxide.

According to this characteristic configuration, the electrolysis cell device described above can be used to synthesize hydrocarbons in the hydrocarbon synthesis reaction unit by receiving hydrogen and carbon monoxide from this device. Here, since the electrolysis cell unit or the electrolysis cell device according to the present invention is provided with at least the reverse water-gas shift reaction unit, carbon monoxide that may be insufficient in electrolysis in the electrolysis reaction unit can be supplemented by this reverse water-gas shift reaction unit, resulting in a compact and high-performance hydrocarbon production system.

In a characteristic configuration of a production method of an electrolysis cell unit according to the present invention,
the production method includes at least a calcination step of performing calcination at a temperature of 450° C. or higher in a step of forming the reverse water-gas shift reaction unit provided in this electrolysis cell unit.

The electrolysis cell unit according to the present invention includes an electrolysis cell in which an electrode layer, an electrolyte layer, and a counter electrode layer are formed, and is provided with the reverse water-gas shift reaction unit. A calcination operation is required to form the electrolysis cell and the reverse water-gas shift reaction unit, but the calcination steps required for the electrolysis cell and the reverse water-gas shift reaction unit can be performed at the same time. Further, it is preferable that the reverse water-gas shift reaction unit provided in the electrolysis cell unit operating in a relatively high temperature range includes a calcination step of performing calcination at a temperature of 450° C. or higher because the catalyst can be used stably. Further, it is more preferable that the calcination temperature is 600° C. or higher, and further preferably 800° C. or higher. In a case where such a calcination temperature is set, for example, even when the reverse water-gas shift reaction unit provided in the solid oxide type electrolysis cell unit operating in the temperature range of about 600° C. to 800° C. is used, in such a high temperature range, functions of the electrolysis cell and the reverse water-gas shift reaction unit can be stably operated for a long period of time. When the calcination temperature is too high, the cost of the calcination step becomes too high, and thus, an upper limit is about 1200° C.

In a characteristic configuration of a use method of an electrolysis cell unit according to the present invention,
the reverse water-gas shift reaction unit is used after being subjected to a reduction pretreatment.

As will be described later, in the catalyst suitable for the reverse water-gas shift reaction unit of the electrolysis cell unit according to the present invention, the active metal component thereof is an oxide in the state before use, and the reduction pretreatment is performed before use. Therefore, activity as the reverse water-gas shift catalyst can be enhanced.

DESCRIPTION OF THE INVENTION

An embodiment of the present invention will be described with reference to the drawings.

Figure 1:
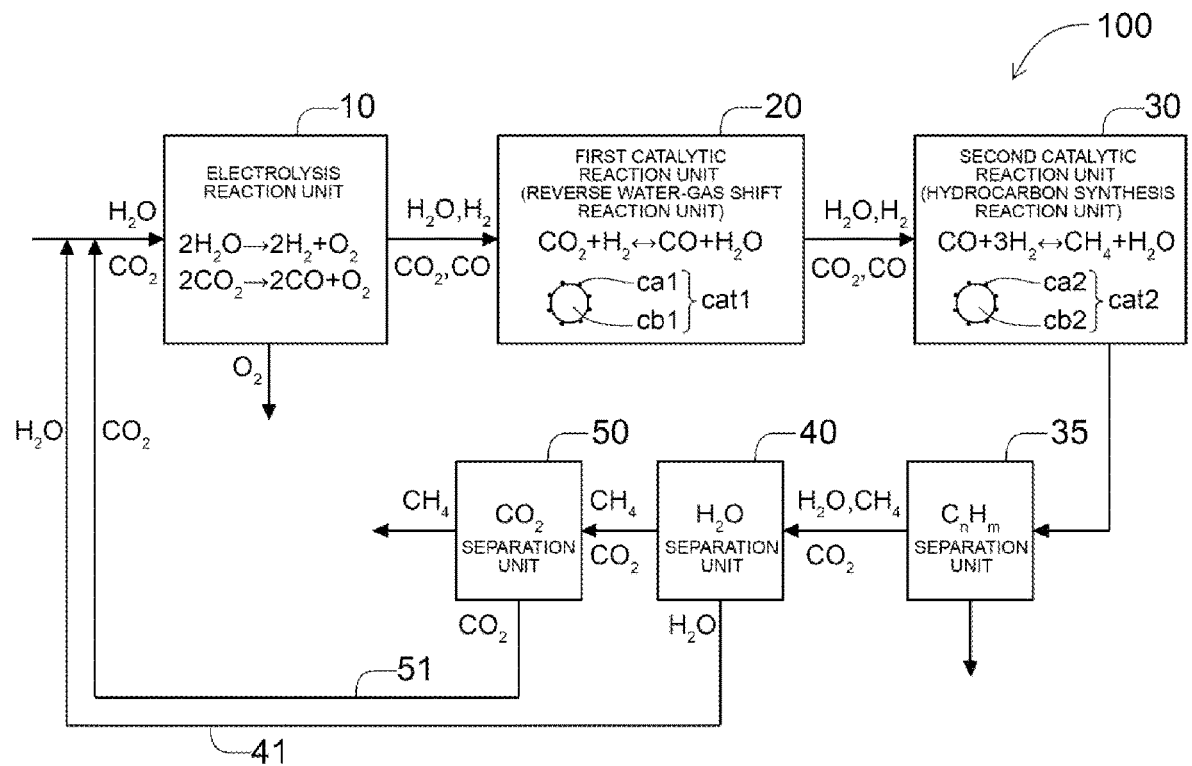
FIG. 1 is a diagram illustrating the configuration of a hydrocarbon production system.

FIG. 1 illustrates a configuration of one form of a hydrocarbon production system 100 proposed by the inventors.

As illustrated in the figure, the hydrocarbon production system 100 includes an electrolysis reaction unit 10, a first catalytic reaction unit 20, a second catalytic reaction unit 30, a heavy hydrocarbon separation unit 35 (illustrated as a CnHm separation unit), a water separation unit 40 (illustrated as an $H_2O$ separation unit), and a carbon dioxide separation unit 50 (illustrated as a $CO_2$ separation unit) in this order.

The electrolysis reaction unit 10 is a unit that electrolyzes at least a portion of an inflowing gas, the first catalytic reaction unit 20 is a reverse water-gas shift reaction unit that carries out a reverse water-gas shift reaction of at least a portion of the inflowing gas, and the second catalytic reaction unit 30 is configured to act as a hydrocarbon synthesis reaction unit that synthesizes at least a portion of the inflowing gas into hydrocarbon. Here, the hydrocarbon synthesized is mainly $CH_4$ (hydrocarbon having one carbon atom), but also includes other lower saturated hydrocarbons having two to four carbon atoms and the like. Further, as will be illustrated later, by appropriately selecting a catalyst used for the second catalytic reaction unit 30, heavy hydrocarbons having a larger number of carbon atoms than the lower saturated hydrocarbons, unsaturated hydrocarbons, oxygen-containing hydrocarbons, or the like can also be synthesized. Therefore, in the present specification, the hydrocarbon is a concept including all of them, and is also collectively referred to as hydrocarbons.

The heavy hydrocarbon separation unit 35, the water separation unit 40, and the carbon dioxide separation unit 50 are units for removing at least a portion of predetermined components (CnHm, $H_2O$, and $CO_2$ in the order of description) from the gas flowing inside. As illustrated in FIG. 1, the components removed and recovered by the water separation unit 40 and the carbon dioxide separation unit 50 are returned to a predetermined unit of the system via a water return path 41 and a carbon dioxide return path 51 and are reused. It is illustrated by $H_2O$ and $CO_2$ returned via both return paths 41 and 51, respectively.

As a result, the hydrocarbon production system 100 is established as a carbon closed system that does not substantially release $CO_2$ to the outside of the system.

In the drawings, the gas flowing into each unit is illustrated in front of each unit, and the gas released from the unit is illustrated after each unit.

In the electrolysis reaction unit 10, $H_2O$ and $CO_2$ as starting materials flow in and are electrolyzed internally, $H_2O$ is decomposed into $H_2$ and $O_2$, and some $CO_2$ is decomposed into CO and $O_2$ and released.

The reaction is described as follows.

$$2H_2O \rightarrow 2H_2 + O_2 \quad \text{(Formula 1)}$$

$$2CO_2 \rightarrow 2CO + O_2 \quad \text{(Formula 2)}$$

The formulas 1 and 2 are also illustrated in a box illustrating the electrolysis reaction unit 10 of FIG. 1.

In the first catalytic reaction unit 20 (reverse water-gas shift reaction unit), $H_2$ and $CO_2$ flow in, a reverse water-gas shift reaction occurs inside, $CO_2$ becomes CO, $H_2$ becomes $H_2O$, and CO and $H_2O$ are released.

The reaction is described as the following equilibrium reaction, but the reverse water-gas shift reaction is a reaction (reaction proceeding in a direction in which $CO_2$ and $H_2$ react to generate CO and $H_2O$) in which the reaction described by the following formula 3 proceeds to the right.

$$CO_2 + H_2 \Leftrightarrow CO + H_2O \quad \text{(Formula 3)}$$

This formula 3 is also illustrated in a box illustrating the first catalytic reaction unit 20 (reverse water-gas shift reaction unit) in FIG. 1. A reverse water-gas shift catalyst cat1 used in the reaction is also schematically illustrated in this box.

In the second catalytic reaction unit 30 (hydrocarbon synthesis reaction unit), $H_2$ and CO flow in, and hydrocarbon is synthesized by a catalytic reaction. For example, the reaction in which $CH_4$ is synthesized from CO and $H_2$ is described as the following equilibrium reaction, but the reaction in which $CH_4$ is synthesized from CO and $H_2$ is a reaction (reaction proceeding in a direction in which CO and $H_2$ react to generate $CH_4$ and $H_2O$) in which the reaction described by the following formula 4 proceeds to the right.

$$CO + 3H_2 \Leftrightarrow CH_4 + H_2O \quad \text{(Formula 4)}$$

This formula 4 is also illustrated in a box illustrating the second catalytic reaction unit 30 (hydrocarbon synthesis reaction unit) in FIG. 1. A hydrocarbon synthesis catalyst cat2 used in the reaction is also schematically illustrated in this box.

Furthermore, the equilibrium reaction of (Formula 3) also occurs at this unit.

Further, depending on the type of catalyst used in the second catalytic reaction unit 30, it is possible to proceed with a Fischer-Tropsch (FT) synthesis reaction or the like. Therefore, various hydrocarbons such as ethane, propane, butane, pentane, hexane, paraffin, and olefinic hydrocarbons can be synthesized from CO and $H_2$.

As will be described later, the inventors have illustrated an example of a catalyst using ruthenium as a catalytically active component of the hydrocarbon synthesis catalyst cat2 disposed in the second catalytic reaction unit 30, but heavy hydrocarbons are also synthesized in a catalyst containing iron, cobalt, or the like as the catalytically active component, and this type of heavy hydrocarbon can be condensed and separated from a transport gas as the temperature decreases. Therefore, the above-mentioned heavy hydrocarbon separation unit 35 separates the hydrocarbon component separated in this manner.

The generated $H_2O$ is separated in the water separation unit 40 and returned to the upstream side of the electrolysis reaction unit 10 via the water return path 41 (water recycle line).

The generated $CO_2$ is separated in the carbon dioxide separation unit 50 and returned to the upstream side of the electrolysis reaction unit 10 via the carbon dioxide return path 51 (carbon dioxide recycle line).

As a result, in this hydrocarbon production system 100, the hydrocarbon is finally synthesized and can be supplied to the outside.

The above is the outline of the above-mentioned hydrocarbon production system 100, and a configuration of each unit and a role thereof will be described below.

[Electrolysis Reaction Unit]

As illustrated above, the electrolysis reaction unit 10 decomposes $H_2O$ and $CO_2$ that flow in by consuming electric power supplied according to the above formulas 1 and 2.

Figure 2:
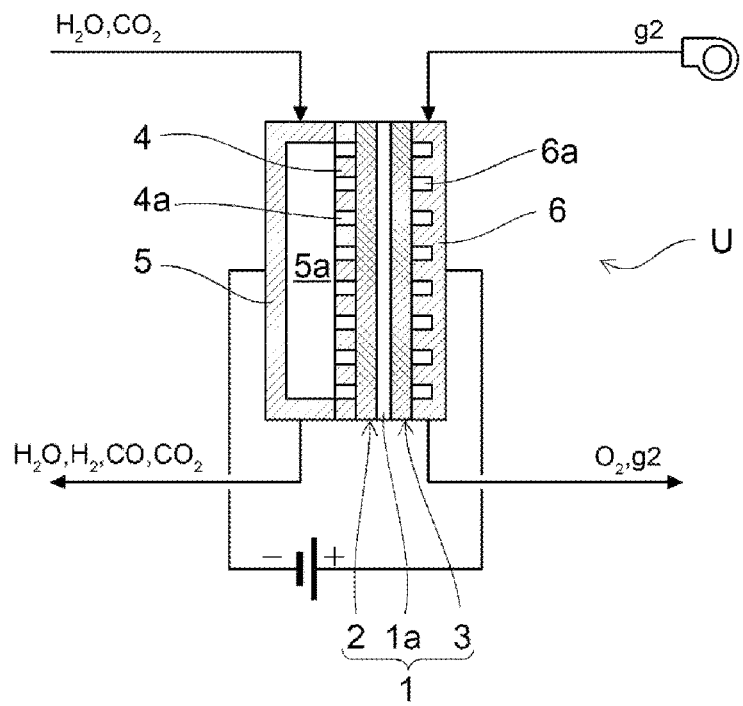
FIG. 2 is a schematic diagram illustrating a configuration of an electrolysis reaction unit.

FIG. 2 schematically illustrates a cross-sectional structure of the electrolysis reaction unit 10.

FIG. 2 illustrates an electrolysis cell unit U which is stacked in multiple to form an electrolysis stack (not illustrated). The electrolysis cell unit U includes an electrolysis cell 1, and the electrolysis cell 1 includes an electrode layer 2 on one surface of an electrolyte layer 1a and a counter electrode layer 3 on the other surface thereof. The electrode layer 2 serves as a cathode in the electrolysis cell 1, and the counter electrode layer 3 serves as an anode. Incidentally, this electrolysis cell unit U is supported by a metal support 4. Here, a case where a solid oxide type electrolysis cell is used as the electrolysis cell 1 is illustrated.

The electrolyte layer 1a can be formed in the state of a thin film having a thickness of 10 μm or less. As a constituent material of the electrolyte layer 1a, YSZ (yttria-stabilized zirconia), SSZ (scandia-stabilized zirconia), GDC (gadolinium-doped ceria), YDC (yttrium-doped ceria), SDC (samarium-doped ceria), and LSGM (strontium/magnesium-added lanthanum gallate), or the like can be used. In particular, zirconia-based ceramics are preferably used.

Preferably, the electrolyte layer 1a is formed by a low-temperature calcination method (for example, a wet method using a calcination treatment in a low temperature range that does not carry out a calcination treatment in a high temperature range exceeding 1100° C.), a spray coating method (thermal spraying method, aerosol deposition method, aerosol gas deposition method, a powder jet deposition method, particle jet deposition method, cold spray method, or the like), a PVD method (sputtering method, a pulse laser deposition method, or the like), a CVD method, or the like. These film forming processes that can be used in a low temperature range provide an electrolyte layer 1a that is dense and has high gastightness and gas barrier properties without using calcination in a high temperature range exceeding, for example, 1100° C. Therefore, damage to the metal support 4 can be suppressed, element mutual diffusion between the metal support 4 and the electrode layer 2 can be suppressed, and an electrolysis cell unit U having excellent performance and durability can be realized. In particular, it is preferable to use the low-temperature calcination method, the spray coating method, or the like because a low-cost element can be realized. Further, it is more preferable to use the spray coating method because the electrolyte layer 1a, which is dense and has high gastightness and gas barrier property, can be easily obtained in a low temperature range.

Further, the electrolyte layer 1a is densely configured in order to prevent the gas leak and exhibit high ionic conductivity. A density of the electrolyte layer 1a is preferably 90% or more, more preferably 95% or more, and further preferably 98% or more. When the electrolyte layer 1a is a uniform layer, the density is preferably 95% or more, and more preferably 98% or more. When the electrolyte layer 1a includes a plurality of layers, it is preferable that at least a portion of the electrolyte layer 1a includes a layer (dense electrolyte layer) having a density of 98% or more, and it is more preferable to include a layer (dense electrolyte layer) having a density of 99% or more. In a case where the dense electrolyte layer is included in a portion of the electrolyte layer 1a, even when the electrolyte layer 1a includes a plurality of layers, it is possible to easily form the electrolyte layer 1a that is dense and has high gastightness and gas barrier property.

The electrode layer 2 can be provided in a thin layer on the front surface of the metal support 4 and in a region larger than a region where holes 4a are provided. In the case of a thin layer, a thickness thereof can be, for example, about 1 μm to 100 μm, preferably 5 μm to 50 μm. With such a thickness, it is possible to secure sufficient electrode performance while reducing the amount of expensive electrode layer material used to reduce costs. The entire region provided with the holes (through holes) 4a is covered with the electrode layer 2. That is, the hole 4a is formed inside the region of the metal support 4 where the electrode layer 2 is formed. In other words, all the holes 4a are provided facing the electrode layer 2.

As the constituent material of the electrode layer 2, for example, a composite material such as NiO-GDC, Ni-GDC, NIO—YSZ, Ni—YSZ, $CuO$—$CeO_2$, Cu—$CeO_2$ can be used. In these examples, GDC, YSZ, and $CeO_2$ can be referred to as aggregates of the composite material. Preferably, the electrode layer 2 is formed by a low-temperature calcination method (for example, a wet method using a calcination treatment in a low temperature range that does not carry out a calcination treatment in a high temperature range exceeding 1100° C.), a spray coating method (thermal spraying method, aerosol deposition method, aerosol gas deposition method, a powder jet deposition method, particle jet deposition method, cold spray method, or the like), a PVD method (sputtering method, a pulse laser deposition method, or the like), a CVD method, or the like. These processes that can be used in the low temperature range provide an improved electrode layer 2 without using, for example, calcination in a high temperature range higher than 1100° C. Therefore, the metal support 4 is not damaged, element mutual diffusion between the metal support 4 and the electrode layer 2 can be suppressed, and an electrochemical element having excellent durability can be realized. Further, it is more preferable to use the low-temperature calcination method because the handling of the raw material becomes easy.

The counter electrode layer 3 can be formed in a thin layer on the surface of the electrolyte layer 1a opposite to the electrode layer 2. In the case of a thin layer, a thickness thereof can be, for example, about 1 μm to 100 μm, preferably 5 μm to 50 μm. With such a thickness, it is possible to secure sufficient electrode performance while reducing the amount of expensive counter electrode layer material used to reduce costs. As the material of the counter electrode layer 3, for example, a composite oxide such as LSCF or LSM, a ceria-based oxide, or a mixture thereof can be used. In particular, it is preferable that the counter electrode layer 3 contains a perovskite-type oxide containing two or more kinds of elements selected from the group consisting of La, Sr, Sm, Mn, Co, and Fc.

The electrolyte layer 1a, the electrode layer 2, and the counter electrode layer 3 are formed as a thin film as described later, and the inventor calls this thin layer forming.

As illustrated above, the electrolysis cell unit U has a metal support type, includes a metal support 4 as a support for the electrode layer 2, and a supply path forming member 5 for forming a U-shaped electrode layer-side gas supply path 5a is provided on a side opposite to the electrode layer 2 in a state where the metal support 4 is interposed therebetween. Further, the metal support 4 is provided with a large number of holes 4a penetrating the front and back surfaces. The gas ($H_2O$ and $CO_2$) supplied through the electrode layer-side gas supply path 5a is subject to electrolysis and is supplied to the electrode layer 2 through a large number of holes 4a. Further, the generated gas ($H_2$, CO) is discharged from the hole 4a.

Meanwhile, also on the counter electrode layer 3 side, a supply path forming member 6 for forming a counter electrode layer-side gas supply path 6a is provided. As illustrated in FIG. 2, the supply path forming member 6 is provided with many grooves on the counter electrode layer 3 side and is configured to supply a transport gas g2 (for example, air) to the counter electrode layer-side gas supply path 6a.

The metal support 4 supports the electrode layer 2, the electrolyte layer 1a, and the counter electrode layer 3 and serves as a support for maintaining the strength of the electrolysis cell 1 and the electrolysis cell unit U as a whole. In this example, the plate-shaped metal support 4 is used as the metal support, but other shapes such as a box shape and a cylindrical shape are also possible.

The metal support 4 may have sufficient strength to form the electrolysis cell unit U as a support, and for example, can use a support having a thickness of about 0.1 mm to 2 mm, preferably about 0.1 mm to 1 mm, and more preferably about 0.1 mm to 0.5 mm. In the present embodiment, the support is made of metal, but ceramics can also be used, for example.

The metal support 4 has, for example, the plurality of holes 4a provided so as to penetrate the front surface and the back surface of the metal plate. For example, the hole 4a can be provided in the metal support 4 by mechanical, chemical, or optical drilling. The hole 4a has a function of allowing gas to pass from the back surface to the front surface of the metal support 4. The hole 4a may be provided so as to be inclined in a gas flow direction (the front and back directions of the paper surface in FIG. 2).

By using a ferrite-based stainless steel material (an example of an Fe—Cr-based alloy) as a material of a base material of the metal support 4, a thermal expansion coefficient of the metal support 4 can be made close to those of YSZ (yttria-stabilized zirconia), GDC (gadolinium-doped ceria, also referred to as CGO), and the like used as materials for the electrode layer 2 and the electrolyte layer 1a. Therefore, the electrolysis cell unit U is less likely to be damaged even when the low temperature and high temperature cycles are repeated. Therefore, it is preferable because the electrolysis cell unit U having excellent long-term durability can be realized.

The same material as that of the metal support 4 can be used for the supply path forming members 5 and 6 of the electrolysis cell unit U, and the thickness thereof can be substantially the same.

Although the metal support 4 and both supply path forming members 5 and 6 have conductivity, they are gastightly configured to function as a separator for separating the supply paths 5a and 6a.

In the electrolysis cell unit U having the above configuration, in an electrolysis operation, DC power is supplied between the pair of electrode layers 2 and 3 provided with the electrolyte layer 1a interposed therebetween from a power supply unit (illustrated by a battery in FIG. 2). In the present embodiment, as illustrated in FIG. 2, the case where the electrode layer 2 side is negative and the counter electrode layer 3 side is positive is illustrated. Depending on the configuration of the electrolysis cell unit U, the electrode layer 2 side may be positive and the counter electrode layer 3 side may be negative.

Then, $H_2O$ and $CO_2$, which are gases to be electrolyzed, are supplied to the electrode layer 2 from an electrolysis raw material supply unit (upstream portion of the electrolysis reaction unit 10 in FIG. 1), and the transport gas g2 is supplied to the counter electrode layer side. Therefore, the reactions illustrated in the formulas 1 and 2 can be caused in the electrolysis cell 1 and the decomposed gas can be taken out. Here, regarding the supply of $H_2O$, either water or steam may be used, or both of them may be used. Therefore, in the present invention, an electrolysis cell device is constructed which includes at least the electrolysis cell unit U, the electrolysis raw material supply unit that supplies water and/or steam and carbon dioxide to the electrolysis cell unit U, and the power supply unit that supplies electric power.

The supplied gas ($H_2O$, $CO_2$) and the released gas ($H_2O$, $H_2$, CO, $O_2$, $CO_2$) in the electrolysis reaction are illustrated above and below the electrolysis cell unit U in FIG. 2. However, this is for ease of understanding, and in fact, the above-mentioned electrode layer-side gas supply path 5a and counter electrode layer-side gas supply path 6a are formed so as to extend in the front and back directions of the paper surface of FIG. 2, and for example, the gas ($H_2O$, $CO_2$) on the supply side described on an upper side of the electrolysis cell unit U in FIG. 2 can be recovered from the front side of the paper surface, and the gas ($H_2O$, $H_2$, CO, $O_2$, $CO_2$) on the release side described on the lower side of the electrolysis cell 1 can be recovered from the back side of the paper surface (refer to FIG. 4 described later). In addition, in order to smoothly perform the discharge of $O_2$ generated in the electrolysis reaction, for example, the transport gas g2 such as air can flow through the electrolysis cell unit U.

When $H_2O$ and $CO_2$ are supplied to the electrolysis reaction unit 10 to carry out the electrolysis, $H_2O$ has a lower electrolysis voltage than $CO_2$ and is easily electrolyzed. Therefore, when $H_2O$ and $CO_2$ having the same amount are temporarily supplied to the electrolysis reaction unit 10 and the electrolysis reaction is carried out, the $H_2$ concentration tends to be higher than the CO concentration at the outlet of the electrolysis reaction unit 10, and unreacted $CO_2$ tends to remain.

[First Catalytic Reaction Unit (Reverse Water-Gas Shift Reaction Unit)]

As illustrated above, the first catalytic reaction unit 20 (reverse water-gas shift reaction unit) causes a reverse water-gas shift reaction, converts $CO_2$ into CO using the supplied $H_2$, and converts $H_2$ into $H_2O$. That is, in the electrolysis reaction unit 10 that supplies $H_2O$ and $CO_2$ to electrolyze, the remaining $CO_2$ that is not decomposed is converted into CO.

The reaction here is as illustrated by the formula 3, but this reaction is an endothermic reaction and is an equilibrium reaction according to the reaction temperature conditions. As a result, as described above, it is preferable that the catalyst is capable of causing the reaction represented by the formula 3 on the high temperature side (for example, 600° C. to 800° C.) as much as possible.

In the description of the catalyst in the present specification, a component having activity as a catalyst may be referred to as a "catalytically active component", and a carrying body carrying the catalytically active component may be referred to as a "carrier (catalyst support)".

The inventors examined various combinations of catalytically active components and carriers as described later, and found that a specific combination was suitable.

In a production of this type of catalyst, by executing an impregnation-supporting step of immersing the carrier in a solution containing a catalytically active component (metal), taking out the carrier, drying and heat-treating the carrier, it is possible to easily obtain a carrier-support catalyst (impregnated supported product) in which the catalytically active component is distributed on the surface of the carrier. This heat treatment is a calcination treatment. The preparation and use of the catalyst will be described with reference to FIGS. 11(a)-(c) and 12(a)-(b).

Figure 11:
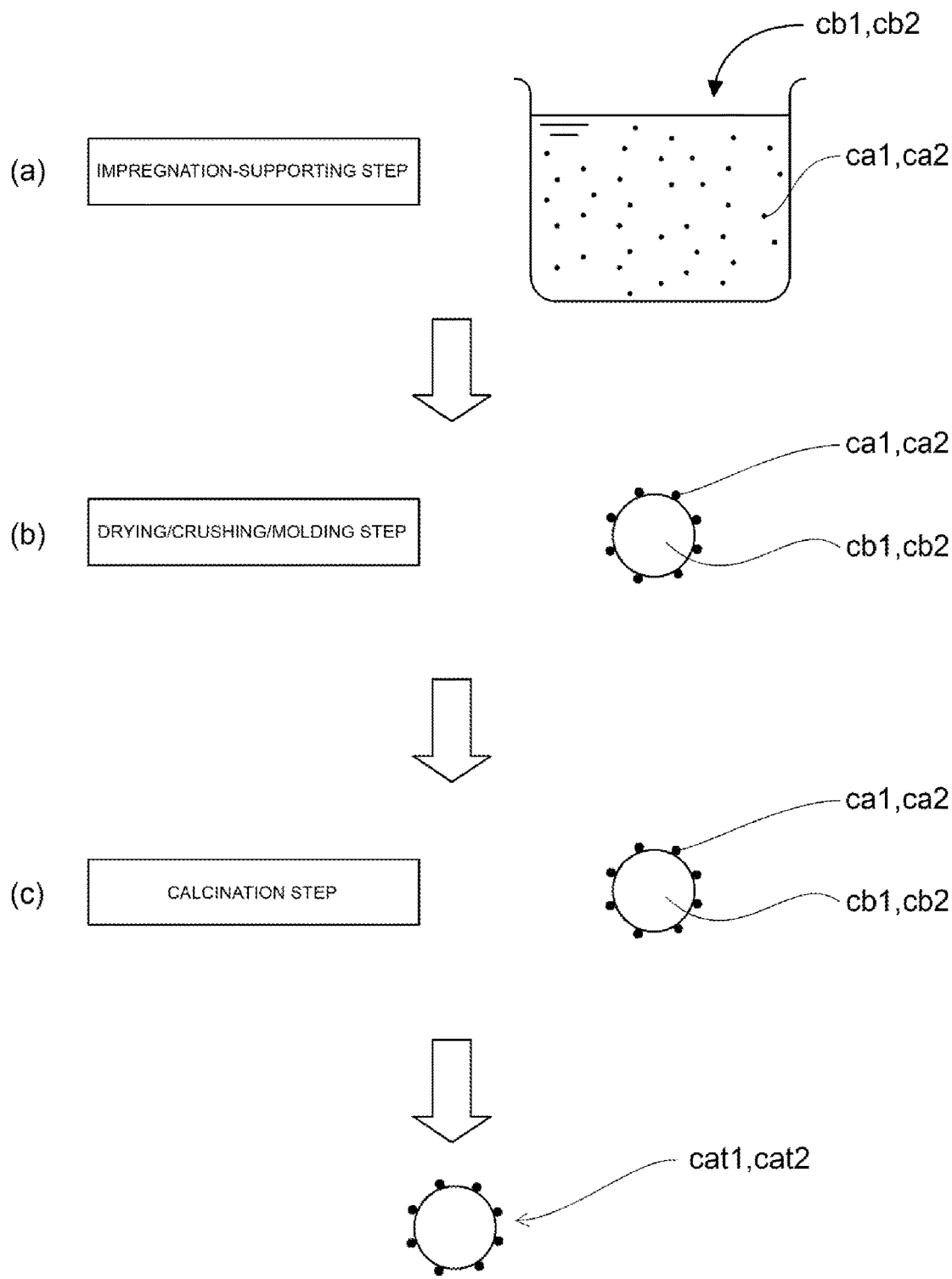
FIGS. 11(a)-(c) are explanatory diagrams illustrating a preparation state of a catalyst.

A preparation method described here is the same except that the starting material is different in the combination of various catalytically active components and carriers. FIGS. 11 (a)-(c) illustrate examples of the reverse water-gas shift catalyst cat1 and the hydrocarbon synthesis catalyst cat2 according to the present invention. In FIGS. 11(a)-(c), the catalytically active component of the reverse water-gas shift catalyst cat1 is referred to as ca1, and the carrier thereof is referred to as cb1. Meanwhile, regarding the hydrocarbon synthesis catalyst cat2, the catalytically active component thereof is ca2 and the carrier thereof is cb2.

As illustrated in FIGS. 11(a)-(c), in the catalyst preparation, after an impregnation-supporting step (a) of obtaining an aqueous solution of a compound containing a metal component (which is a metal catalyst) to be the catalytically active components ca1 and ca2, inputting the carriers cb1 and cb2 into the aqueous solution, and carrying out stirring and impregnation is executed, a drying/crushing/molding step (b) of carrying out evaporative drying, drying, and crushing and molding is executed, and thereafter, a calcination step (c) of calcinating an obtained molded product in the air is executed, and thus, the target product (cat1, cat2) can be obtained. Therefore, this form of catalyst is also referred to as an impregnation-supported catalyst.

Figure 12:
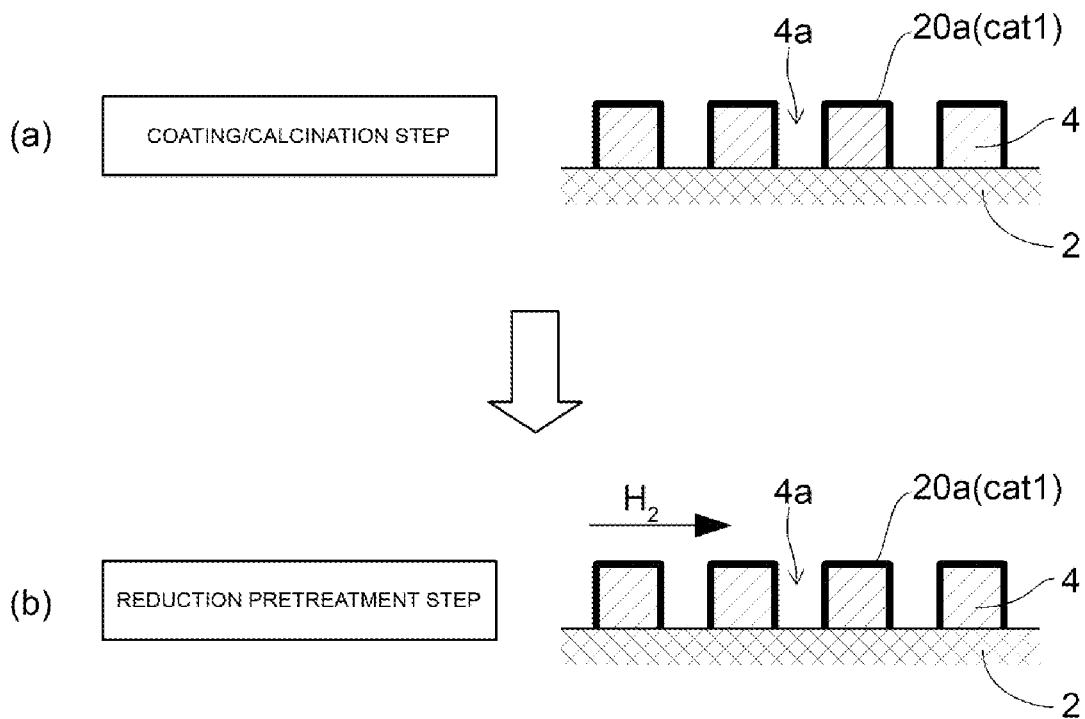
FIGS. 12(a)-(b) are explanatory diagrams illustrating a coating/calcination state and reduction pretreatment of a catalyst.

In this case, as illustrated in the example of the reverse water-gas shift catalyst cat1 in FIGS. 12(a)-(b), the catalyst can be applied to a portion where the catalyst is used and calcinated. FIG. 12(a) illustrates a coating/calcination step in which the reverse water-gas shift catalyst cat1 is applied to the metal support 4 in which the holes 4a are perforated to form a coating layer 20a, and the coating layer 20a is calcinated. FIG. 12(b) illustrates a reduction pretreatment step in which $H_2$ flows to carry out a reduction pretreatment before using the reverse water-gas shift catalyst cat1.

When the calcination treatment is carried out in air, the supported catalytically active components ca1 and ca2 are in a state where a part or all of them are oxidized. Before using the catalyst, a so-called reduction pretreatment may be carried out to reduce the catalytically active component in an oxidized state to sufficiently enhance the activity. FIG. 12(b) illustrates a state in which a reducing gas (typically $H_2$) is circulated on the surface of the catalyst to carry out the reduction pretreatment.

(Catalyst Used)

As the reverse water-gas shift catalyst cat1 used for the first catalytic reaction unit 20, the inventors have selected a catalyst that satisfies the following requirements.

A catalyst composed by supporting at least one or two of platinum, nickel, and iron as the catalytically active component ca1 on the carrier cb1 containing a ceria-based metal oxide or a zirconia-based metal oxide as a main component. Here, since the strength of the catalyst cat1 can be increased, a ratio of the carrier cb1 to the entire catalyst is preferably 55% by weight or more, more preferably 60% by weight or more, and further preferably 65% by weight or more. Further, an upper limit of this ratio can be, for example, 99.5% by weight, but when the upper limit is more than this, the catalytically active component ca1 cannot be sufficiently supported, and it may be difficult to obtain the effect as the reverse water-gas shift catalyst cat1.

Further, as the ceria-based metal oxide, ceria doped with at least one of gadolinium, samarium, and yttrium can also be used.

Further, as the zirconia-based metal oxide, zirconia stabilized by at least one of yttria and scandia can also be used.

Since the reverse water-gas shift reaction can proceed satisfactorily, a supported amount of the catalytically active component ca1 is preferably 0.5% by weight or more, more preferably 1% by weight or more, and further preferably 5% by weight or more. Further, when the supported amount of the catalytically active component ca1 is increased too much, it becomes difficult to support the catalytically active component ca1 in a high dispersion, it is difficult to obtain a significant improvement in the catalytic activity, and the catalyst cost also increases. Accordingly, the supported amount of the catalytically active component ca1 is preferably 35% by weight or less, more preferably 30% by weight or less, and further preferably 25% by weight or less.

Further, it is also preferable to add either one or two of platinum, nickel, and iron to the catalytically active component ca1 to support copper as a further catalytically active component ca1. In this configuration, the supported amount of copper is equal to or less than the supported amount of the catalytically active component ca1 with either one or both of nickel and iron as a main catalytically active component ca1.

Hereinafter, test results of Examples in the case where the catalytically active component ca1 and the carrier cb1 are variously changed as the reverse water-gas shift catalyst cat1 used for the first catalytic reaction unit 20 will be described.

As catalytically active components ca1, Ni and Fe were examined, and Pt (platinum) was also examined.

As the carrier cb1, $Al_2O_3$ (alumina) was also examined using $ZrO_2$ (zirconia), YSZ (yttria-stabilized zirconia), GDC (gadolinium-doped ceria), and $CeO_2$ (ceria) as examples.

In the following description, Test 1 and Test 2 will be introduced, but a difference between the two tests is that in the calcination of the reverse water-gas shift catalyst cat1, the calcination temperature of Test 1 is set to 450° C., and the calcination temperature of Test 2 is set to a high temperature side of 600° C. to 1000° C.

(Test 1)

The test results of Examples (1 to 19) when the carrier is variously changed as the catalyst used for the first catalytic reaction unit 20 will be described.

As catalytically active components, Ni and Fe were examined, and Pt (platinum) was also examined.

As the carrier, $ZrO_2$ (zirconia), YSZ (yttria-stabilized zirconia), GDC (gadolinium-doped ceria), and $CeO_2$ (ceria) were used as examples, and $Al_2O_3$ (alumina) was also examined.

(Catalyst Preparation)

In preparing the reverse water-gas shift catalyst cat1, an aqueous solution is obtained by quantifying and dissolving any one or both of a water-soluble nickel compound (nickel nitrate, nickel chloride, nickel sulfate, nickel ammonium sulfate, nickel acetate, nickel oxalate, nickel citrate, or the like) and a water-soluble iron compound (iron nitrate, iron chloride, iron sulfate, ammonium iron sulfate, iron acetate, iron oxalate, iron citrate, or the like) according to the composition of the target catalyst. Further, when supporting copper as another catalytically active component ca1, an aqueous solution is obtained by similarly quantifying and dissolving a water-soluble copper compound (copper nitrate, copper chloride, copper sulfate, ammonium copper sulfate, copper acetate, copper oxalate, copper citrate, or the like). A predetermined amount of carrier powder (ceria, zirconia, GDC, YSZ, $Al_2O_3$) is added to the aqueous solution, stirred and impregnated, then evaporated to dryness, dried, then crushed and molded, and then calcinated in air. This impregnation is the "impregnation-supporting step" referred to in the present invention, and the result is the "impregnated supported product".

The catalysts of the following examples were prepared using nickel nitrate hexahydrate, iron nitrate nonahydrate, and copper nitrate trihydrate, respectively. The catalyst using Pt was prepared using tetraammine platinum hydroxide.

In the above catalyst preparation, temperatures of evaporation to dryness, drying, and calcination could be carried out in a generally used temperature range, but in Test 1, the catalysts of the following examples were each at 80° C., 80° C., and 450° C.

Table 1 illustrates Examples 1 to 19 of the reverse water-gas shift catalyst cat1 in the present invention.

A horizontal axis represents the type of carrier cb1, a metal supported amount (% by weight; expressed as wt. % in the table) as the catalytically active component, a CO adsorption amount (ml/g), and a BET surface area ($m^2$/g).

Regarding the CO adsorption amount, the CO adsorption amount was measured after the catalyst was subjected to a reduction pretreatment at 350° C. for 1 hour under a hydrogen atmosphere.

TABLE 1

| Catalyst | Carrier | Metal supported amount (wt. %) | CO adsorption amount (Nml/g) | BET surface area ($m^2$/g) |
| --- | --- | --- | --- | --- |
| Example 1 | Ni/$ZrO_2$ | $ZrO_2$ | Ni: 9.5 | 1.48 | 11.1 |
| Example 2 | Ni/8YSZ | 8YSZ | Ni: 9.5 | 1.97 | 11.3 |
| Example 3 | Ni/GDC | GDC | Ni: 9.1 | 3.61 | 14.3 |
| Example 4 | Ni/$CeO_2$ | $CeO_2$ | Ni: 14 | 0.47 | 9.4 |
| Example 5 | Ni—Fe/$CeO_2$ | $CeO_2$ | Ni: 9.1 Fe: 0.46 | 0.45 | 8.9 |
| Example 6 | Ni—Cu/$CeO_2$ | $CeO_2$ | Ni: 9.2 Cu: 0.49 | 0.78 | 10.6 |

TABLE 1-continued

| Catalyst | Carrier | Metal supported amount (wt. %) | CO adsorption amount (Nml/g) | BET surface area ($m^2$/g) |
| --- | --- | --- | --- | --- |
| Example 7 | Ni/$Al_2O_3$ | $Al_2O_3$ | Ni: 8.9 | 0.65 | 90.7 |
| Example 8 | Fe/$ZrO_2$ | $ZrO_2$ | Fe: 9.6 | 0.88 | 12.0 |
| Example 9 | Fe/8YSZ | 8YSZ | Fe: 9.5 | 0.22 | 7.5 |
| Example 10 | Fe/GDC | GDC | Fe: 9.2 | 0.30 | 15.2 |
| Example 11 | Fe/$CeO_2$ | $CeO_2$ | Fe: 9.3 | 0.53 | 10.3 |
| Example 12 | Fe—Ni/$ZrO_2$ | $ZrO_2$ | Fe: 9.7 Ni: 0.49 | 0.52 | 13.0 |
| Example 13 | Fe—Cu/$ZrO_2$ | $ZrO_2$ | Fe: 9.7 Cu: 0.50 | 0.21 | 10.5 |
| Example 14 | Fe/$Al_2O_3$ | $Al_2O_3$ | Fe: 8.8 | 0.31 | 82.8 |
| Example 15 | Pt/$ZrO_2$ | $ZrO_2$ | Pt: 0.95 | 0.95 | 11.2 |
| Example 16 | Pt/8YSZ | 8YSZ | Pt: 0.92 | 1.18 | 4.8 |
| Example 17 | Pt/GDC | GDC | Pt: 0.96 | 1.10 | 10.0 |
| Example 18 | Pt/$CeO_2$ | $CeO_2$ | Pt: 0.95 | 1.17 | 7.9 |
| Example 19 | Pt/$Al_2O_3$ | $Al_2O_3$ | Pt: 0.95 | 1.85 | 97.8 |

(Catalytic Activity Test)

In the catalytic activity test, a mixed gas of 50% $H_2$-50% $CO_2$ (a mixed gas containing $H_2$ and $CO_2$ in a ratio of 1:1 (volume ratio)) was used as a reaction gas, and the reaction temperature was changed from 600° C. to 800° C. in increments of 50° C. under the conditions in which a Gas Hourly Space Velocity (GHSV) was 10000/h.

Before conducting the catalytic activity test, the reduction pretreatment of the catalyst was carried out at 600° C. while flowing a hydrogen gas through the catalyst layer.

As the test results, a $CO_2$ conversion rate (%), a CO concentration (%) at the outlet of the reaction unit, and a $CH_4$ concentration (%) are illustrated in Table 2.

The $CO_2$ conversion rate (%) was calculated according to the following formula based on a gas analysis result at the outlet of the catalyst layer.

[$CH_4$ concentration]+[CO concentration]/([$CH_4$ concentration]+[CO concentration]+[$CO_2$ concentration])

As illustrated above, in the reverse water-gas shift catalyst cat1 used in the first catalytic reaction unit 20 (reverse water-gas shift reaction unit), it is desirable that the $CO_2$ conversion rate (%) on the high temperature side (for example, around 600 to 800° C.) is high.

TABLE 2

| Catalyst | | | Reaction temperature (° C.) | | | | |
| --- | --- | --- | --- | --- | --- | --- | --- |
| | | | 600 | 650 | 700 | 750 | 800 |
| Example 1 | Ni/$ZrO_2$ | $CO_2$ conversion rate (%) | 31.8 | 37.6 | 41.6 | 44.0 | 46.1 |
| | | Outlet CO concentration (%) | 17.9 | 23.1 | 25.8 | 28.0 | 29.7 |
| | | Outlet $CH_4$ concentration (%) | 3.7 | 0.9 | 0.3 | 0.1 | 0.1 |
| Example 2 | Ni/8YSZ | $CO_2$ conversion rate (%) | 32.7 | 36.4 | 37.5 | 39.3 | 40.7 |
| | | Outlet CO concentration (%) | 16.9 | 21.1 | 22.7 | 23.7 | 24.8 |
| | | Outlet $CH_4$ concentration (%) | 4.0 | 1.3 | 0.6 | 0.4 | 0.2 |
| Example 3 | Ni/GDC | $CO_2$ conversion rate (%) | 29.9 | 33.8 | 36.2 | 38.5 | 39.6 |
| | | Outlet CO concentration (%) | 14.3 | 18.8 | 21.1 | 22.8 | 24.3 |
| | | Outlet $CH_4$ concentration (%) | 5.1 | 2.0 | 0.9 | 0.4 | 0.2 |
| Example 4 | Ni/$CeO_2$ | $CO_2$ conversion rate (%) | 34.5 | 38.9 | 41.9 | 44.7 | 47.4 |
| | | Outlet CO concentration (%) | 18.4 | 23.3 | 25.8 | 27.9 | 30.2 |
| | | Outlet $CH_4$ concentration (%) | 3.4 | 0.8 | 0.2 | 0.1 | 0.0 |
| Example 5 | Ni—Fe/$CeO_2$ | $CO_2$ conversion rate (%) | 34.1 | 40.0 | 42.0 | 45.6 | 47.7 |
| | | Outlet CO concentration (%) | 18.6 | 23.6 | 27.3 | 29.0 | 30.5 |
| | | Outlet $CH_4$ concentration (%) | 3.4 | 0.8 | 0.2 | 0.1 | 0.0 |
| Example 6 | Ni—Cu/$CeO_2$ | $CO_2$ conversion rate (%) | 35.2 | 41.0 | 44.2 | 46.9 | 48.6 |
| | | Outlet CO concentration (%) | 19.2 | 24.4 | 27.3 | 29.1 | 31.0 |
| | | Outlet $CH_4$ concentration (%) | 3.3 | 0.8 | 0.2 | 0.1 | 0.0 |
| Example 7 | Ni/$Al_2O_3$ | $CO_2$ conversion rate (%) | 28.5 | 33.6 | 35.9 | 37.4 | 39.5 |
| | | Outlet CO concentration (%) | 15.4 | 19.3 | 21.6 | 23.2 | 23.9 |
| | | Outlet $CH_4$ concentration (%) | 4.6 | 1.8 | 0.8 | 0.6 | 0.4 |

TABLE 2-continued

| Catalyst | | | Reaction temperature (° C.) | | | | |
|---|---|---|---|---|---|---|---|
| | | | 600 | 650 | 700 | 750 | 800 |
| Example 8 | Fe/ZrO$_2$ | CO$_2$ conversion rate (%) | 39.7 | 42.3 | 45.1 | 47.5 | 49.6 |
| | | Outlet CO concentration (%) | 23.0 | 25.4 | 27.2 | 29.3 | 31.2 |
| | | Outlet CH$_4$ concentration (%) | 0.0 | 0.0 | 0.0 | 0.0 | 0.0 |
| Example 9 | Fe/8YSZ | CO$_2$ conversion rate (%) | 36.3 | 40.4 | 43.1 | 45.9 | 47.5 |
| | | Outlet CO concentration (%) | 22.5 | 25.4 | 27.6 | 29.3 | 31.2 |
| | | Outlet CH$_4$ concentration (%) | 0.0 | 0.0 | 0.0 | 0.0 | 0.0 |
| Example 10 | Fe/GDC | CO$_2$ conversion rate (%) | 35.8 | 40.2 | 42.5 | 44.6 | 46.8 |
| | | Outlet CO concentration (%) | 21.9 | 25.2 | 27.0 | 28.6 | 30.4 |
| | | Outlet CH$_4$ concentration (%) | 0.0 | 0.0 | 0.0 | 0.0 | 0.0 |
| Example 11 | Fe/CeO$_2$ | CO$_2$ conversion rate (%) | 37.2 | 40.9 | 43.5 | 45.4 | 48.3 |
| | | Outlet CO concentration (%) | 22.9 | 25.3 | 27.6 | 29.6 | 31.4 |
| | | Outlet CH$_4$ concentration (%) | 0.0 | 0.0 | 0.0 | 0.0 | 0.0 |
| Example 12 | Fe-Ni/ZrO$_2$ | CO$_2$ conversion rate (%) | 38.1 | 41.6 | 44.0 | 46.8 | 48.3 |
| | | Outlet CO concentration (%) | 23.3 | 25.4 | 27.6 | 29.6 | 31.5 |
| | | Outlet CH$_4$ concentration (%) | 0.1 | 0.0 | 0.0 | 0.0 | 0.0 |
| Example 13 | Ni—Cu/CeO$_2$ | CO$_2$ conversion rate (%) | 36.5 | 41.3 | 45.1 | 47.3 | 49.2 |
| | | Outlet CO concentration (%) | 22.9 | 25.3 | 27.5 | 29.6 | 31.4 |
| | | Outlet CH$_4$ concentration (%) | 0.3 | 0.1 | 0.0 | 0.0 | 0.0 |
| Example 14 | Fe/Al$_2$O$_3$ | CO$_2$ conversion rate (%) | 22.5 | 27.6 | 33.7 | 40.0 | 45.0 |
| | | Outlet CO concentration (%) | 12.7 | 15.8 | 20.1 | 24.5 | 28.6 |
| | | Outlet CH$_4$ concentration (%) | 0.1 | 0.0 | 0.0 | 0.0 | 0.0 |
| Example 15 | Pt/ZrO$_2$ | CO$_2$ conversion rate (%) | 34.0 | 39.8 | 43.0 | 45.7 | 48.2 |
| | | Outlet CO concentration (%) | 19.0 | 24.4 | 27.0 | 29.2 | 31.3 |
| | | Outlet CH$_4$ concentration (%) | 3.2 | 0.7 | 0.2 | 0.1 | 0.0 |
| Example 16 | Pt/8YSZ | CO$_2$ conversion rate (%) | 35.1 | 40.7 | 44.1 | 46.4 | 48.8 |
| | | Outlet CO concentration (%) | 19.3 | 24.5 | 27.3 | 29.4 | 31.3 |
| | | Outlet CH$_4$ concentration (%) | 3.2 | 0.7 | 0.2 | 0.1 | 0.0 |
| Example 17 | Pt/GDC | CO$_2$ conversion rate (%) | 32.9 | 38.6 | 42.5 | 45.2 | 47.8 |
| | | Outlet CO concentration (%) | 18.6 | 23.5 | 26.4 | 28.8 | 30.6 |
| | | Outlet CH$_4$ concentration (%) | 3.3 | 0.8 | 0.2 | 0.1 | 0.0 |
| Example 18 | Pt/CeO$_2$ | CO$_2$ conversion rate (%) | 34.9 | 39.4 | 43.1 | 45.6 | 48.3 |
| | | Outlet CO concentration (%) | 19.7 | 24.1 | 26.5 | 29.4 | 31.4 |
| | | Outlet CH$_4$ concentration (%) | 2.7 | 0.8 | 0.2 | 0.1 | 0.0 |
| Example 19 | Pt/Al$_2$O$_3$ | CO$_2$ conversion rate (%) | 35.5 | 41.1 | 44.7 | 47.5 | 49.6 |
| | | Outlet CO concentration (%) | 19.4 | 24.6 | 27.6 | 29.7 | 31.2 |
| | | Outlet CH$_4$ concentration (%) | 3.2 | 0.8 | 0.2 | 0.1 | 0.0 |

(Test 2)

Hereinafter, the test results of Examples (20 to 29) of Test 2 will be described. Even in this test, Ni and Fe were examined as catalytically active components, and the addition of Cu was also examined.

As the carrier, CeO$_2$ (ceria) and ZrO$_2$ (zirconia) are used as examples, and Al$_2$O$_3$ (alumina) is also examined.

(Catalyst Preparation)

The reverse water-gas shift catalyst cat1 used in Test 2 was prepared in the same manner as in Test 1 except that the calcination temperatures were changed to 600° C., 800° C., and 1000° C.

Table 3 illustrates the catalyst of each of Examples (20 to 29) prepared.

TABLE 3

| Catalyst | | Carrier | Calcination temperature (° C.) | CO adsorption amount (Nml/g) | BET surface area (m$^2$/g) |
|---|---|---|---|---|---|
| Example 20 | Ni/CeO$_2$ | CeO$_2$ | 600 | 0.9 | 8.9 |
| Example 21 | Ni—Cu/CeO$_2$ | CeO$_2$ | 600 | 0.53 | 9.1 |
| Example 22 | Fe/ZrO$_2$ | ZrO$_2$ | 600 | 0.27 | 13.4 |
| Example 23 | Fe/Al$_2$O$_3$ | Al$_2$O$_3$ | 600 | 0.15 | 96.0 |
| Example 24 | Ni/CeO$_2$ | CeO$_2$ | 800 | 0.26 | 7.6 |
| Example 25 | Ni—Cu/CeO$_2$ | CeO$_2$ | 800 | 0.51 | 7.6 |
| Example 26 | Fe/ZrO$_2$ | ZrO$_2$ | 800 | 0.16 | 10.1 |
| Example 27 | Fe/Al$_2$O$_3$ | Al$_2$O$_3$ | 800 | 0.14 | 83.5 |
| Example 28 | Ni/CeO$_2$ | CeO$_2$ | 1000 | 0.08 | 5.2 |
| Example 29 | Fe/ZrO$_2$ | ZrO$_2$ | 1000 | 0.29 | 8.1 |

(Catalytic Activity Test)

In the catalytic activity test, a mixed gas containing H$_2$ and CO$_2$ in a ratio of 1:1 (volume ratio) was used as a reaction gas, and the reaction temperature was changed from 600° C. to 800° C. in increments of 50° C. under the conditions in which GHSV was 10000/h.

Before conducting the catalytic activity test, the reduction pretreatment of the catalyst was carried out at 600° C. while flowing a hydrogen gas through the catalyst layer.

As the test results, the CO$_2$ conversion rate (%), the CO concentration (%) at the outlet of the reaction unit, and the CH$_4$ concentration (%) are illustrated in Table 4.

TABLE 4

| Catalyst | | | Reaction temperature (° C.) | | | | |
|---|---|---|---|---|---|---|---|
| | | | 600 | 650 | 700 | 750 | 800 |
| Example 20 | Ni/CeO$_2$ | CO$_2$ conversion rate (%) | 33.8 | 39.5 | 42.8 | 45.7 | 48.1 |
| | | Outlet CO concentration (%) | 18.8 | 24.2 | 27.4 | 29.6 | 31.4 |
| | | Outlet CH$_4$ concentration (%) | 3.3 | 0.8 | 0.2 | 0.0 | 0.0 |
| Example 21 | Ni-Cu/CeO$_2$ | CO$_2$ conversion rate (%) | 34.7 | 40.4 | 42.9 | 44.6 | 46.7 |
| | | Outlet CO concentration (%) | 19.1 | 24.4 | 27.0 | 28.6 | 29.9 |
| | | Outlet CH$_4$ concentration (%) | 3.7 | 0.9 | 0.2 | 0.1 | 0.0 |
| Example 22 | Fe/ZrO$_2$ | CO$_2$ conversion rate (%) | 38.1 | 40.4 | 43.1 | 45.7 | 48.2 |
| | | Outlet CO concentration (%) | 23.3 | 25.8 | 28.0 | 30.2 | 31.8 |
| | | Outlet CH$_4$ concentration (%) | 0.0 | 0.0 | 0.0 | 0.0 | 0.0 |
| Example 23 | Fe/Al$_2$O$_3$ | CO$_2$ conversion rate (%) | 24.8 | 29.0 | 35.3 | 40.6 | 45.3 |
| | | Outlet CO concentration (%) | 14.0 | 16.8 | 20.8 | 25.3 | 29.5 |
| | | Outlet CH$_4$ concentration (%) | 0.0 | 0.0 | 0.0 | 0.0 | 0.0 |
| Example 24 | Ni/CeO$_2$ | CO$_2$ conversion rate (%) | 33.9 | 39.2 | 42.7 | 45.6 | 47.1 |
| | | Outlet CO concentration (%) | 19.2 | 24.6 | 27.4 | 29.5 | 31.7 |
| | | Outlet CH$_4$ concentration (%) | 3.3 | 0.7 | 0.2 | 0.0 | 0.0 |
| Example 25 | Ni—Cu/CeO$_2$ | CO$_2$ conversion rate (%) | 34.2 | 39.3 | 41.9 | 44.3 | 46.6 |
| | | Outlet CO concentration (%) | 18.5 | 23.9 | 26.0 | 28.7 | 30.7 |
| | | Outlet CH$_4$ concentration (%) | 3.6 | 0.9 | 0.1 | 0.1 | 0.0 |
| Example 26 | Fe/ZrO$_2$ | CO$_2$ conversion rate (%) | 38.1 | 41.2 | 43.7 | 46.2 | 48.4 |
| | | Outlet CO concentration (%) | 23.5 | 25.7 | 28.1 | 30.0 | 31.9 |
| | | Outlet CH$_4$ concentration (%) | 0.0 | 0.0 | 0.0 | 0.0 | 0.0 |
| Example 27 | Fe/Al$_2$O$3_3$ | CO$_2$ conversion rate (%) | 22.2 | 25.2 | 32.7 | 38.9 | 43.9 |
| | | Outlet CO concentration (%) | 13.4 | 15.1 | 20.0 | 24.5 | 29.1 |
| | | Outlet CH$_4$ concentration (%) | 0.0 | 0.0 | 0.0 | 0.0 | 0.0 |
| Example 28 | Ni/CeO$_2$ | CO$_2$ conversion rate (%) | 34.5 | 40.6 | 44.5 | 46.3 | 48.7 |
| | | Outlet CO concentration (%) | 19.1 | 24.6 | 28.6 | 30.4 | 31.8 |
| | | Outlet CH$_4$ concentration (%) | 3.5 | 0.8 | 0.2 | 0.1 | 0.0 |
| Example 29 | Fe/ZrO$_2$ | CO$_2$ conversion rate (%) | 37.8 | 41.2 | 44.5 | 46.0 | 48.1 |
| | | Outlet CO concentration (%) | 22.6 | 25.5 | 27.6 | 29.5 | 31.3 |
| | | Outlet CH$_4$ concentration (%) | 0.0 | 0.0 | 0.0 | 0.0 | 0.0 |
| Reference (equilibrium value) | | CO$_2$ conversion rate (%) | 34.6 | 39.9 | 43.6 | 46.4 | 49.0 |

For reference, an equilibrium value (calculated value) of the $CO_2$ conversion rate under the experimental conditions is illustrated in Table 4.

Iron/Zirconia Catalyst and Iron/Alumina Catalyst

For the iron/zirconia catalyst, the test results when the calcination temperatures are 450° C., 600° C., 800° C., and 1000° C. are illustrated in Example 8, Example 22, Example 26, and Example 29, respectively. Meanwhile, for the iron/alumina catalyst, the test results when the calcination temperatures are 450° C., 600° C., and 800° C. are illustrated in Example 14, Example 23, and Example 27, respectively. As can be seen from these results, although the metal supported amount is slightly different, the iron/zirconia catalyst is superior to the iron/alumina catalyst in the activity in carrying out the reverse water-gas shift reaction. Further, the iron/zirconia catalyst has extremely high catalytic activity not only when the calcination temperature is 450° C. but also when the calcination temperature is as high as 600° C., 800° C., and 1000° C., and regardless of the calcination temperature, the $CO_2$ conversion rate of the iron/zirconia catalyst reaches the vicinity of the equilibrium value.

Nickel/Ceria Catalyst

The test results when the calcination temperatures are 450° C., 600° C., 800° C., and 1000° C. are illustrated in Example 4, Example 20, Example 24, and Example 28, respectively. As can be seen from these results, the nickel/ceria catalyst has extremely high catalytic activity not only when the calcination temperature is 450° C. but also when the calcination temperature is as high as 600° C., 800° C., and 1000° C., and regardless of the calcination temperature, the $CO_2$ conversion rate of nickel/ceria catalyst reaches the vicinity of the equilibrium value.

Nickel/Alumina Catalyst

Example 7 illustrates the test results when the calcination temperature is 450° C. As a result, the nickel/alumina catalyst had a lower $CO_2$ conversion rate than the nickel/ceria catalyst described above.

Nickel/Copper/Ceria Catalyst

The test results when the calcination temperatures are 450° C., 600° C., and 800° C. are illustrated in Example 6, Example 21, and Example 25, respectively. From these results, it can be seen that the $CO_2$ conversion rate of the nickel/copper/ceria catalysts tends to decrease slightly when the calcination temperature thereof is as high as 600° C. or 800° C., but the calcination temperature conditions described above are superior to those of the similar iron/alumina catalyst. Further, in the nickel/copper/ceria catalyst having the calcination temperature of 450° C., the $CO_2$ conversion rate reaches the vicinity of the equilibrium value.

Usefulness as Reverse Water-Gas Shift Catalyst

As illustrated above, the iron/zirconia-based catalysts and the nickel/ceria-based catalysts exhibit extremely high reverse water-gas shift catalytic activity even when the calcination temperature is variously changed to 450° C. to 1000° C., and thus, for example, even when used in combination with a solid oxide type electrolysis cell used in a high temperature range of around 600° C. to 800° C., it is easy to secure high performance and durability, which is useful.

From the above results, as illustrated above, as the reverse water-gas shift catalyst cat1 used for the first catalytic reaction unit 20, the catalyst obtained by supporting at least one or both of nickel and iron as the catalytically active component ca1 on the carrier cb1 containing the ceria-based metal oxide or the zirconia-based metal oxide as a main component can be used. Furthermore, platinum can also be used when the cost is acceptable.

Further, as the ceria-based metal oxide as the carrier cb1, ceria doped with at least one of gadolinium, samarium, and yttrium can also be used.

Further, the zirconia-based metal oxide as the carrier cb1 can be zirconia stabilized by at least one of yttria and scandia.

Further, it is also preferable to add either one or both of nickel and iron to the catalytically active component ca1 to support copper as a further catalytically active component ca1.

By using the reverse water-gas shift catalyst cat1 in the first catalytic reaction unit 20 (reverse water-gas shift reaction unit), the reverse water-gas shift reaction can be carried out at around 600 to 1000° C. with the $CO_2$ conversion rate (%) equal to or higher than that of the Pt catalyst, which is highly active but very expensive.

Since the test of this example was carried out under a very high GHSV condition of 10000/h, by reducing the GHSV to less than 10000/h, that is, by increasing the amount of catalyst used with respect to the amount of gas to be treated, it is possible to carry out the reverse water-gas shift reaction at a higher $CO_2$ conversion rate (%).

[Combination of Electrolysis Reaction Unit and Reverse Water-Gas Shift Reaction Unit]

In the description so far, according to the system configuration illustrated in FIG. 1, the electrolysis reaction unit 10 and the reverse water-gas shift reaction unit 20 are individually provided in the order described along the flow direction of the gas.

Figure 3:
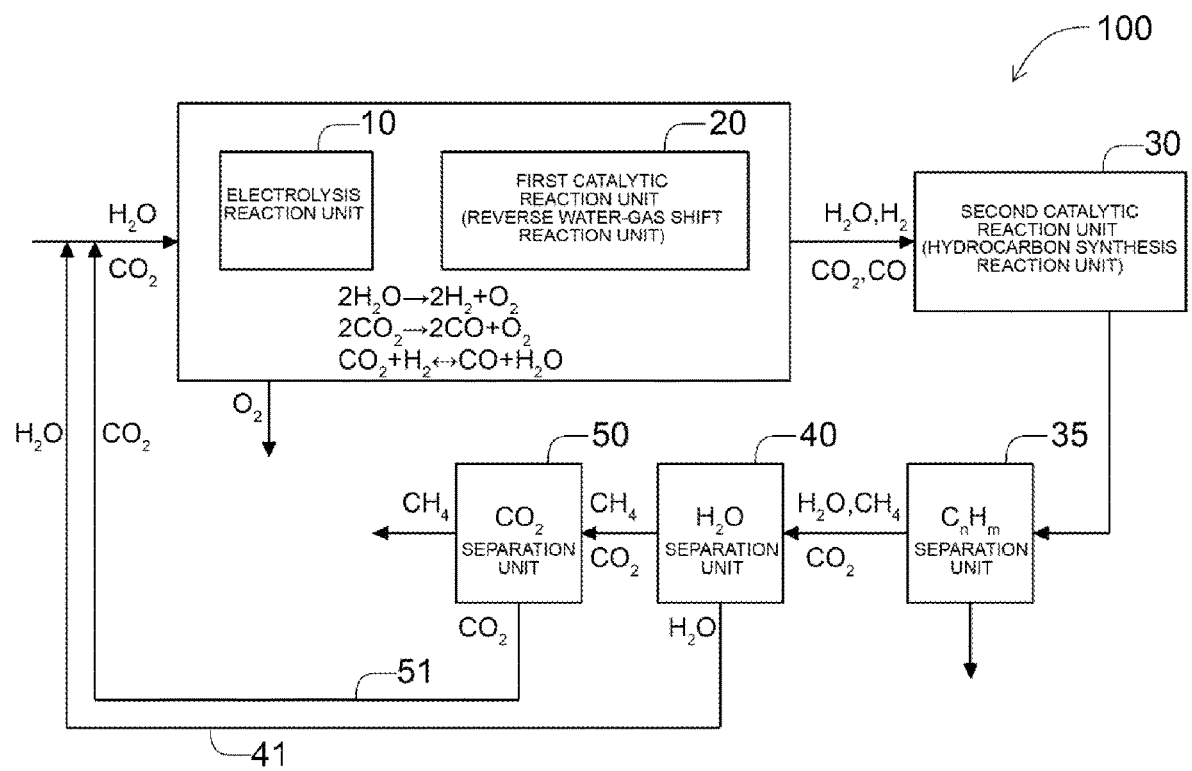
FIG. 3 is a diagram illustrating the configuration of a system in which the electrolysis reaction unit and a reverse water-gas shift reaction unit are integrated.

The reaction of the electrolysis reaction unit 10 is an exothermic reaction depending on the reaction conditions, and the reaction of the reverse water-gas shift reaction unit 20 is an endothermic reaction. Therefore, thermal efficiency of the system can be improved by integrating the two reaction units 10 and 20. In this way, FIG. 3 illustrates a configuration in which the two reaction units 10 and 20 are combined and integrated, and the integration is illustrated to surround both units. In addition, a reaction when integrated in the same box in this way is illustrated. Basically, the above-mentioned formulas 1, 2, and 3 are carried out. In a case where the electrolysis reaction unit 10 and the reverse water-gas shift reaction unit 20 are combined and integrated, preferably, when the units are surrounded together by a heat insulating member, heat can be efficiently transferred between the electrolysis reaction unit 10 and the reverse water-gas shift reaction unit 20. Further, in order to transfer the heat generated in the electrolysis reaction unit 10 to the reverse water-gas shift reaction unit 20, the electrolysis reaction unit 10 and the reverse water-gas shift reaction unit 20 may be connected using a heat transfer member.

[Electrolysis Cell Unit Equipped with Both Electrolysis Reaction Unit and Reverse Water-Gas Shift Reaction Unit]

Based on the above concept, it is preferable to provide the reverse water-gas shift reaction unit 20 in the electrolysis cell unit U which is the electrolysis reaction unit 10. This is because when a solid oxide type electrolysis cell that operates at around 600 to 800° C. is used as the electrolysis cell 1, in the reverse water-gas shift catalyst cat1 of the present application which can obtain high activity at around 600 to 800° C., the electrolysis reaction unit 10 and the reverse water-gas shift reaction unit 20 can be used in the same temperature range.

In this case as well, it is sufficient that the gas that has passed through the electrolysis reaction unit 10 is guided to the reverse water-gas shift reaction unit 20 to generate the reverse water-gas shift reaction.

Figure 4:
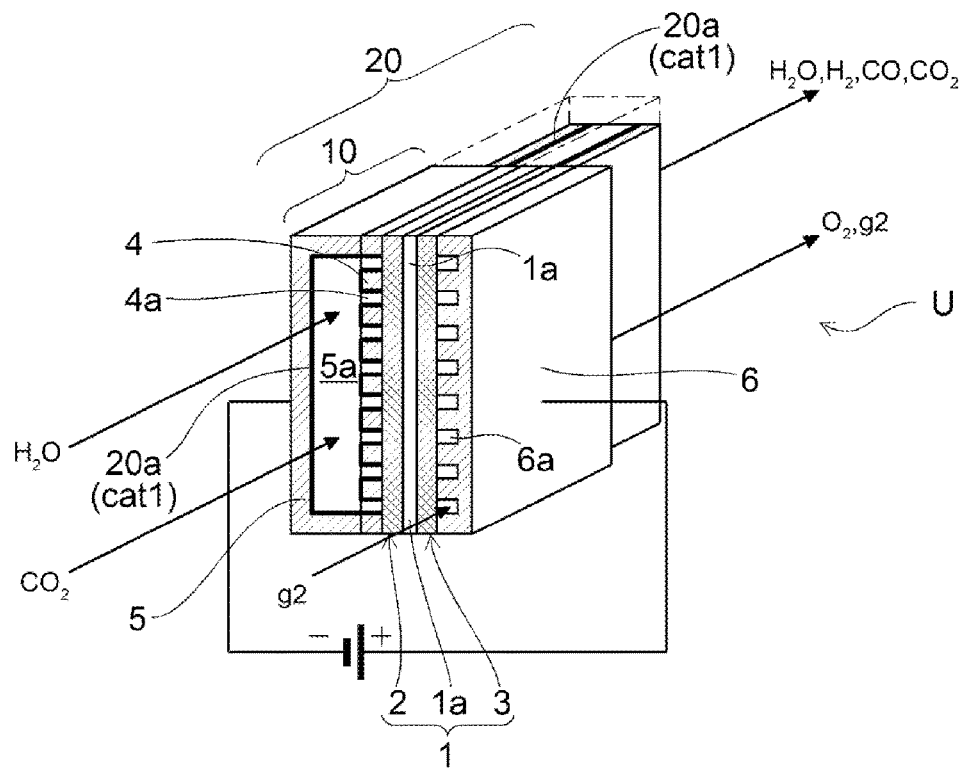
FIG. 4 is a schematic diagram of an electrolysis cell unit including the electrolysis reaction unit and the reverse water-gas shift reaction unit.

FIG. 4 illustrates an electrolysis cell unit U provided with such a reverse water-gas shift reaction unit 20. FIG. 4 is a diagram illustrating the electrolysis cell unit U illustrated in cross section in FIG. 2 including the flow direction of the gas.

As illustrated in FIG. 4, the cross sections of the electrolysis cell unit U are basically the same.

That is, the electrolysis cell unit U also includes the electrolysis cell 1 in which the electrode layer 2 and the counter electrode layer 3 are formed with the electrolyte layer 1a interposed therebetween, the metal support 4 which functions as a support thereof and also acts as a separator, and the supply path forming members 5 and 6, and the electrode layer-side gas supply path 5a and the counter electrode layer-side gas supply path 6a are formed in the electrolysis cell unit U. More specifically, as can be seen from FIG. 4, when the metal support 4 is viewed in the flow direction of gas, the holes 4a are provided in the portion corresponding to the electrolysis cell 1, but the hole is not provided on the downstream side of the electrode layer 2. Therefore, the metal support 4 is a separator which effectively separates the gas which is supplied to the electrode layer 2 and released from the electrode layer 2, and the gas which is supplied to the counter electrode layer 3 gas and is released from the counter electrode layer 3.

However, in this example, the reverse water-gas shift catalyst cat1 described above is applied to an inner surface (supply path-side inner surface of supply path forming member 5, surface of the metal support 4 opposite to surface on which electrode layer 2 is formed, and surfaces of the plurality of holes 4a) of the electrode layer-side gas supply path 5a. A coating layer 20a is illustrated by a thick solid line.

Further, the electrode layer-side gas supply path 5a extends beyond the electrolysis reaction unit 10, and the coating layer 20a is also provided on the extension side.

As a result, the electrode layer-side gas supply path 5a of the electrolysis cell unit U is a discharge path for discharging at least $H_2$ generated in the electrode layer 2, and the electrolysis cell unit U is integrally provided with the electrolysis reaction unit 10 and the reverse water-gas shift reaction unit 20.

In this configuration, the metal support 4 acts as a separator that separates $H_2$ generated in the electrode layer 2 and $O_2$ generated in the counter electrode layer 3, and at least a portion of the separator on the discharge path side of $H_2$ is reverse water-gas shift reaction unit 20.

By stacking the electrolysis cell units U configured in this way in a right-left direction of FIGS. 2 and 4, a large number of electrolysis cell units U are stacked, and it is possible to form a so-called electrolysis cell module (not illustrated) in which the electrolysis cell units are electrically connected to each other. Of course, a useful gas generated can be obtained over multiple layers.

The inventors have stored a granular reverse water-gas shift catalyst cat1 in the electrode layer-side gas supply path 5a and conducted an experiment under a concept in which the electrolysis reaction unit 10 and the reverse water-gas shift reaction unit 20 are combined with each other (the electrode layer-side gas supply path 5a of the electrolysis reaction unit 10 is the reverse water-gas shift reaction unit 20).

Figure 5:
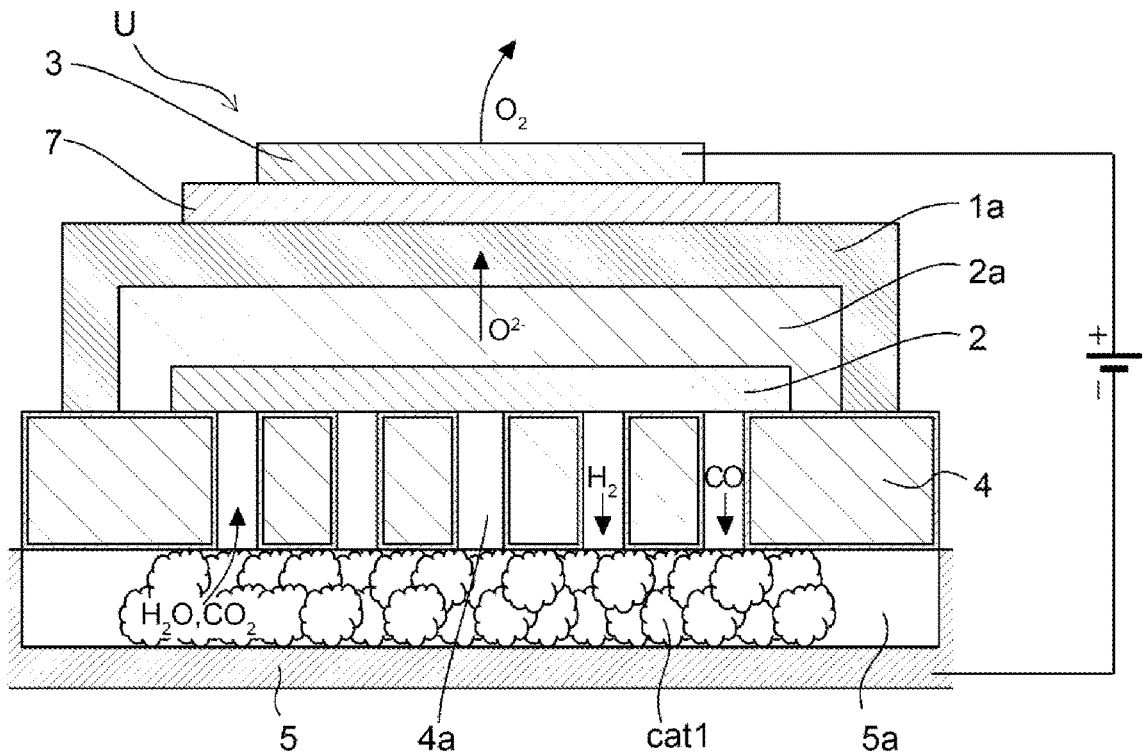
FIG. 5 is a cross-sectional view of an electrolysis cell unit used in a comparative experiment in which an electrode layer-side gas supply path is used as the reverse water-gas shift reaction unit.

FIG. 5 illustrates a cross section of the electrolysis cell unit U used in this experiment.

Hereinafter, a specific description will be given with reference to FIG. 5. FIG. 5 illustrates a cross-sectional view of the electrolysis cell unit U.

Here, as the electrolysis cell 1, a metal-supported solid oxide type electrolysis cell was used. As the metal support 4, a metal substrate was prepared by providing a plurality of through holes (which become holes 4a) by applying laser processing to a ferritic stainless steel metal plate having a thickness of 0.3 mm. The electrode layer 2 and an intermediate layer 2a were laminated in this order on the metal substrate, and the electrolyte layer 1a was laminated on the intermediate layer 2a of the metal substrate so as to cover the intermediate layer 2a. Further, a reaction prevention layer 7 and the counter electrode layer 3 were sequentially laminated on the electrolyte layer 1a to prepare the electrolysis cell 1. A mixture of NiO powder and GDC powder was used as the material for forming the electrode layer 2, GDC powder was used as the material for forming the intermediate layer 2a. 8YSZ (8 mol % yttria-stabilized zirconia) powder was used as the material for forming the electrolyte layer 1a, GDC powder was used as the material for forming the reaction prevention layer 7, and a mixture of and GDC powder and LSCF powder was used as the material for forming the counter electrode layer 3. Further, the thicknesses of the electrode layer 2, the intermediate layer 2a, the electrolyte layer 1a, the reaction prevention layer 7, and the counter electrode layer 3 were about 25 μm, about 10 μm, about 5 μm, about 5 μm, and about 20 μm, respectively. By providing the intermediate layer 2a between the electrode layer 2 and the electrolyte layer 1a and providing the reaction prevention layer 7 between the electrolyte layer 1a and the counter electrode layer 3, the performance and durability of the electrolysis cell 1 can be improved. Moreover, preferably, the intermediate layer 2a and the reaction prevention layer 7 are formed by a low-temperature calcination method (for example, a wet method using a calcination treatment in a low temperature range that does not carry out a calcination treatment in a high temperature range exceeding 1100° C.), a spray coating method (thermal spraying method, aerosol deposition method, aerosol gas deposition method, a powder jet deposition method, particle jet deposition method, cold spray method, or the like), a PVD method (sputtering method, a pulse laser deposition method, or the like), a CVD method, or the like. These processes that can be used in the low temperature range provide the improved intermediate layer 2a and reaction prevention layer 7 without using, for example, calcination in a high temperature range higher than 1100° C. Therefore, it is preferable because the electrolysis cell 1 having excellent performance and durability can be realized without damaging the metal support 4. Further, it is more preferable to use the low-temperature calcination method because the handling of the raw material becomes easy.

Regarding the electrolysis cell unit U obtained as described above, the performance improvement in the case where the reverse water-gas shift catalyst cat1 formed in the form of particles was stored in the electrode layer-side gas supply path 5a (which also serves as the discharge path of the gas electrolyzed by the electrolysis reaction unit 10) was examined.

Results when reverse water-gas shift catalyst cat1 is not stored

An electrolysis reaction was carried out while supplying a gas containing $H_2O$ and $CO_2$ to the electrolysis cell unit U, and a ratio of $H_2$ to CO of an outlet gas of the electrolysis cell unit U was measured using a gas chromatograph. The results are illustrated in Table 5 below. The experimental results are described as Comparative Examples A1 and A2.

TABLE 5

| | Inlet gas | Electrolysis voltage (V) | Reaction temperature (° C.) | Ratio of $H_2/CO$ of outlet gas |
|---|---|---|---|---|
| Comparative Example A1 | 52% $H_2O$—13% $CO_2$—$N_2$ balance | 1.2 | 700 | 14.2 |
| Comparative Example A2 | 49% $H_2O$—17% $CO_2$—$N_2$ balance | 1.2 | 700 | 9.9 |

Results when the Reverse Water-Gas Shift Catalyst Cat1 is Stored

As the reverse water-gas shift catalyst cat1, a granular catalyst obtained by supporting about 10% of Ni on the 8YSZ carrier similar to in Example 2 was stored, an electrolysis reaction was carried out while supplying a gas containing $H_2O$ and $CO_2$ to the electrolysis cell unit U, and the ratio of $H_2$ to CO of the outlet gas of the electrolysis cell unit U was measured using a gas chromatograph. The results are illustrated in Table 6. The experimental result is described as Example A1.

TABLE 6

| | Inlet gas | Electrolysis voltage (V) | Reaction temperature (° C.) | Ratio of $H_2/CO$ of outlet gas |
|---|---|---|---|---|
| Example A1 | 51% $H_2O$—16% $CO_2$—$N_2$ balance | 1.15 | 700 | 5.4 |

By the above comparative experiment, in the electrolysis cell unit U in which the electrolysis cell 1 was formed in a thin layer on the metal support 4, and the reverse water-gas shift reaction unit 20 generating CO by using $CO_2$ and $H_2$ by the reverse water-gas shift reaction was provided in the electrode layer-side gas supply path 5a which was the discharge path of the electrolyzed gas, it was possible to increase a composition ratio of CO to $H_2$ generated by electrolysis.

In the comparison between the electrolysis cell unit U in which the reverse water-gas shift catalyst cat1 is not stored in the electrode layer-side gas supply path 5a (which is the discharge path for the electrolyzed gas) and the electrolysis cell unit U in which the reverse water-gas shift catalyst cat1 is stored, the hydrogen/carbon monoxide ([$H_2$/CO]) ratio changes from about 10 or more to about 5 at the outlet, and by combining the reaction of the electrolysis reaction unit 10 and the reaction of the reverse water-gas shift reaction unit 20, the amount of CO that is advantageous for various hydrocarbon syntheses can be secured, which is preferable. In addition, since thermal efficiency of the hydrocarbon production system 100 can be improved by adopting a methanation reaction of CO rather than a methanation reaction of $CO_2$, by combining the reaction of the electrolysis reaction unit 10 and the reaction of the reverse water-gas shift reaction unit 20, the amount of CO can be secured, which is preferable. This is because 2 mol of $H_2O$ is generated when 1 mol of $CO_2$ is methanized, whereas 1 mol of $H_2O$ is generated when 1 mol of CO is methanized, and thus, the hydrocarbon production system 100 that employs the methanation reaction of CO can suppress latent heat and sensible heat loss of 1 mol of $H_2O$ as a whole system.

By appropriately adjusting the ratio of $H_2O$ and $CO_2$ introduced into the electrolysis reaction unit 10, the reaction conditions (electrolysis voltage, reaction temperature, or the like) of the electrolysis reaction unit 10, the reaction conditions (amount of catalyst used, GHSV, reaction temperature, or the like) of the reverse water-gas shift reaction unit 20, or the like, the hydrogen/carbon monoxide ([$H_2$/CO]) ratio at the outlet of the reverse water-gas shift reaction unit 20 can be adjusted to a value (for example, $H_2$/CO=3 which is the equivalent ratio of the methanation reaction of CO, or the like) suitable for the second catalytic reaction unit 30 (hydrocarbon synthesis reaction unit) in the subsequent stage.

[Install Heat Exchanger Between Electrolysis Reaction Unit and Reverse Water-Gas Shift Reaction Unit]

Figure 6:
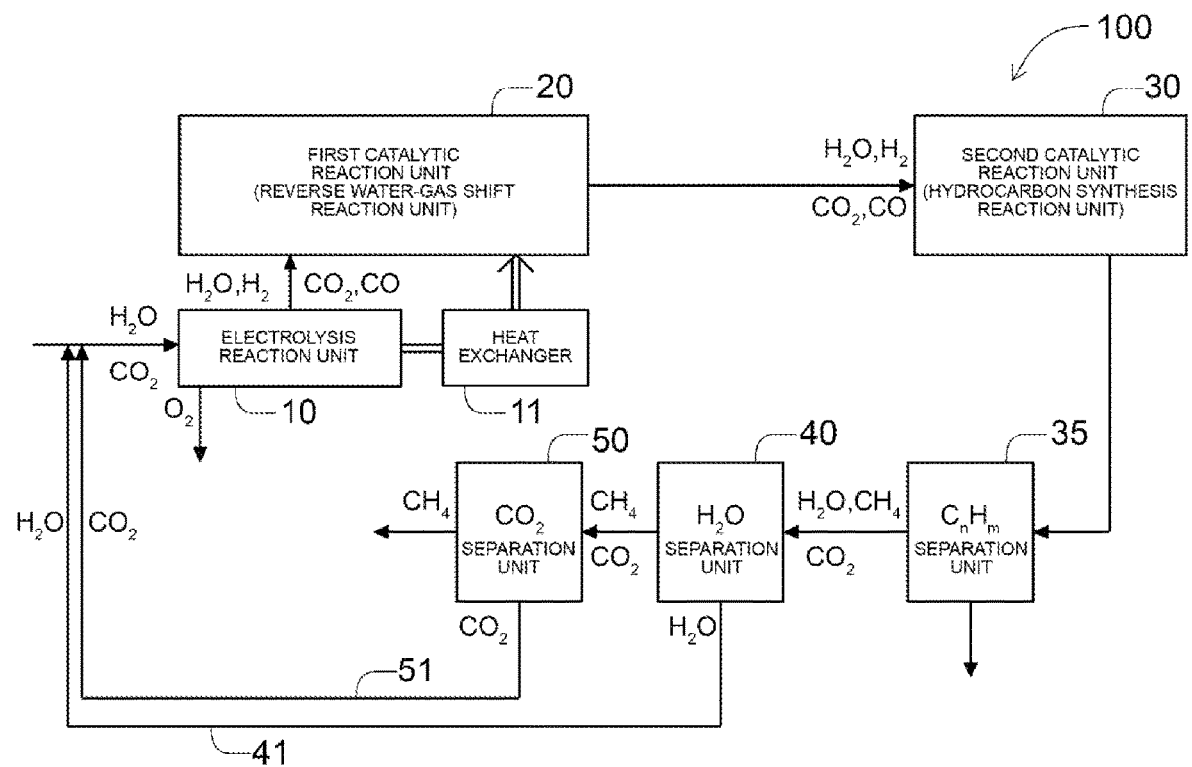
FIG. 6 is a configuration diagram of a system equipped with a heat exchanger between the electrolysis reaction unit and the reverse water-gas shift reaction unit.

In the descriptions so far, the example in which the electrolysis reaction unit 10 and the first catalytic reaction unit (reverse water-gas shift reaction unit) 20 are integrated has been mainly described, however, it is possible to adopt a configuration in which heat exchanger 11 is provided between both units 10 and 20 so that heat can be exchanged between both units. For example, in the structure of FIG. 4 described above, the reverse water-gas shift reaction unit 20 is extended to the downstream side, but a heat exchange layer having high thermal conductivity can be separately provided between the extending section and the reverse water-gas shift reaction unit 20. This configuration is illustrated in FIG. 6 corresponding to FIG. 1. A hollow double line illustrates the heat transfer between both units. In this configuration, the temperature of each of the units 10 and 20 can be appropriately controlled.

The inventors have called the system including the electrolysis reaction unit 10 and the reverse water-gas shift reaction unit 20 described so far as an "electrolysis reaction system".

[Second Catalytic Reaction Unit (Hydrocarbon Synthesis Reaction Unit)]

At least $H_2$ and CO flow into the second catalytic reaction unit 30 (hydrocarbon synthesis reaction unit), and hydrocarbons (methane and various hydrocarbons having two or more carbon atoms) and the like are generated by the catalytic reaction.

(Example of Hydrocarbon Synthesis Catalyst)

As an activity test of the catalyst (hydrocarbon synthesis catalyst cat2) used in the second catalytic reaction unit 30, the inventors conducted the following evaluation test 1, evaluation test 2, and evaluation test 3.

As an example of the hydrocarbon synthesis catalyst cat2, a catalyst was prepared by variously changing the carrier and the catalytically active component. As the catalytically active component ca2, those obtained by adding Mo, V, Fe, Co, and the like to Ru and Ru, and Ni were examined. As the carrier cb2, $ZrO_2$, $Al_2O_3$, $SiO_2$, MgO, and $TiO_2$ were examined.

(Catalyst Preparation)

The preparation of the hydrocarbon synthesis catalyst cat2 is also the method adopted as described with reference to FIGS. 11(*a*)-(*c*) and 12(*a*)-(*b*).

That is, a water-soluble ruthenium compound (ruthenium nitrate, ruthenium chloride, ruthenium sulfate, ruthenium ammonium sulfate, ruthenium acetate, ruthenium oxalate, ruthenium citrate, or the like) is quantified and dissolved according to the composition of the target catalyst to obtain an aqueous solution. Further, when molybdenum, vanadium, iron, and cobalt are supported as further catalytically active components, these water-soluble metal compounds are similarly quantified to obtain a dissolved aqueous solution. Using the aqueous solution, for example, by impregnating and supporting the catalytically active component on carrier particles ($ZrO_2$, $Al_2O_3$, $SiO_2$, MgO, $TiO_2$) having a predetermined amount, and carrying out necessary treatment steps such as a drying treatment, a calcination treatment, and a reduction treatment, the hydrocarbon synthesis catalyst cat2 can be obtained.

Using ruthenium chloride aqueous solution, ammonium molybdate aqueous solution, vanadyl oxalate aqueous solution, iron nitrate aqueous solution, and cobalt nitrate aqueous solution, respectively, and when both ruthenium and catalytically active components other than ruthenium are supported, the catalysts of the following examples were prepared using a sequential carrier method (a two-step carrier method in which a catalytically active component other than ruthenium is first supported on a carrier and then ruthenium is supported).

(Evaluation Test 1)

In the evaluation test 1, a mixed gas containing 12.4% CO, 24.8% $CO_2$, 37.2% $H_2$, 12.4% $H_2O$ and the balance being $N_2$ was used as the reaction gas, GHSV was set to 4000/h (WET base), and the activity test of the hydrocarbon synthesis catalyst cat2 was carried out at a reaction temperature of 275° C. to 360° C. In this case, the reaction gas is an example obtained by assuming a model in which a co-electrolysis reaction between water and carbon dioxide in the electrolysis reaction unit 10 is carried out under the conditions that an electrolysis reaction rate of carbon dioxide is low, and a mixed gas of CO, $CO_2$, $H_2$, and $H_2O$ after the reverse water-gas shift reaction of carbon dioxide is carried out in the reverse water-gas shift reaction unit 20 installed in the subsequent stage is introduced into the hydrocarbon synthesis reaction unit 30 to carry out the hydrocarbon synthesis reaction.

The following two indicators were adopted when organizing the test results.

$CO_2$ removal assumed hydrocarbon conversion rate=
[number of carbons in hydrocarbons in outlet gas]/[number of carbons in outlet gas-number of carbons in outlet $CO_2$]        1.

This indicator is an indicator illustrating the conversion rate to hydrocarbons when $CO_2$ is removed from the outlet gas of the hydrocarbon synthesis reaction unit 30 obtained by the catalytic reaction, and it is preferable that this indicator is high.

$C1$-$C4$ calorific value $(MJ/Nm^3)=\Sigma(Nn \times HN)/\Sigma n$        2.

Nn [mol]: number of moles of Cn hydrocarbon in gas of catalytic reaction unit (n=1 to 4)
HN [$MJ/m^3$ (N)]: calorific value of Cn hydrocarbon in gas of catalytic reaction unit
[H1=39.8, H2=69.7, H3=99.1, H4=128.5]

This indicator is an indicator illustrating amounts of C1 to C4 components contained in the outlet gas of the hydrocarbon synthesis reaction unit 30 obtained by the catalytic reaction, and when this value exceeds 39.8, it can be confirmed that hydrocarbons such as ethane, propane, and butane are generated in addition to methane.

Regarding the evaluation test 1, Tables 7 and 8 illustrated below illustrate Examples B1 to B3 of the hydrocarbon synthesis catalyst cat2 in the present invention.

TABLE 7

| | Catalyst | Carrier | Active component supported amount (wt. %) | BET surface area ($m^2/g$) | CO adsorption amount (ml/g) |
|---|---|---|---|---|---|
| Example B1 | Ru/$Al_2O_3$ | $Al_2O_3$ | Ru: 0.4 | 87.4 | 0.66 |
| Example B2 | Ru/Mo/$Al_2O_3$ | $Al_2O_3$ | Ru: 0.6, Mo: 0.7 | 88.2 | 1.06 |
| Example B3 | Ru/V/$Al_2O_3$ | $Al_2O_3$ | Ru: 0.7, V: 1.2 | 91.1 | 1.20 |

TABLE 8

| | | | Reaction temperature (° C.) | | | |
|---|---|---|---|---|---|---|
| | Catalyst | Indicator | 275 | 310 | 335 | 360 |
| Example B1 | Ru/$Al_2O_3$ | $CO_2$ removal assumed hydrocarbon conversion rate (%) | 12.4 | | | 100.0 |
| | | $C_1$-$C_4$ calorific value ($MJ/Nm^3$) | 44.9 | | | 39.8 |
| Example B2 | Ru/Mo/$Al_2O_3$ | $CO_2$ removal assumed hydrocarbon conversion rate (%) | | | 99.8 | |
| | | $C_1$-$C_4$ calorific value ($MJ/Nm^3$) | | | 39.9 | |
| Example B3 | Ru/V/$Al_2O_3$ | $CO_2$ removal assumed hydrocarbon conversion rate (%) | | 90.0 | | |
| | | $C_1$-$C_4$ calorific value ($MJ/Nm^3$) | | 42.1 | | |

As illustrated in Tables 7 and 8, it was confirmed that hydrocarbons could be synthesized using a catalyst in which ruthenium was supported on an alumina carrier or a catalyst in which molybdenum or vanadium was supported in addition to ruthenium as a hydrocarbon synthesis catalyst cat2 from the mixed gas of CO, $CO_2$, $H_2$, and $H_2O$.

From the above results, it was confirmed that the above-mentioned hydrocarbon production system 100 could generate a high-calorie gas having a C1-C4 calorific value of 39 $MJ/Nm^3$ or more.

(Evaluation Test 2)

In the evaluation test 2, a mixed gas containing 0.45% CO, 18.0% $CO_2$, 71.55% $H_2$, and 10.0% $H_2O$ was used as the reaction gas, GHSV was set to 5000/h (DRY base), and the activity test of the hydrocarbon synthesis catalyst cat2 was carried out at a reaction temperature of about 230° C. to about 330° C. In this case, the reaction gas is an example obtained by assuming a model in which the mixed gas obtained when the co-electrolysis reaction of water and carbon dioxide is carried out in the electrolysis reaction unit 10 under the conditions that the electrolysis reaction rate of carbon dioxide is low is introduced into the hydrocarbon synthesis reaction unit 30 to carry out a hydrocarbon synthesis reaction.

The following two indicators were adopted when organizing the test results.

hydrocarbon conversion rate=[number of carbons in hydrocarbons in outlet gas]/[number of carbons in outlet gas]    1.

This indicator is an indicator illustrating the ratio of the number of carbons converted into hydrocarbons without being converted into $CO_2$ among the total carbons flowing in, and it is preferable that this indicator is high.

$CO_2$ removal assumed hydrocarbon conversion rate= [number of carbons in hydrocarbons in outlet gas]/[number of carbons in outlet gas−number of carbons in outlet $CO_2$]    2.

This indicator is an indicator illustrating the conversion rate to hydrocarbons when $CO_2$ is removed from the outlet gas of the hydrocarbon synthesis reaction unit obtained by the catalytic reaction, and it is preferable that this indicator is also high.

For the evaluation test 2, the used catalysts (Examples B4 to B16) are illustrated in Table 9, and the test results are illustrated in Table 10.

TABLE 9

| Catalyst | Carrier | Active component supported amount (wt. %) | BET surface area ($m^2$/g) | CO adsorption amount (ml/g) |
|---|---|---|---|---|
| Example B4 | $Ru/Al_2O_3$ | $Al_2O_3$ | Ru: 1.3 | 109.8 | 0.47 |
| Example B5 | $Ru/SiO_2$ | $SiO_2$ | Ru: 1.0 | 212.3 | 0.13 |
| Example B6 | Ru/MgO | MgO | Ru: 1.3 | 24.7 | 0.15 |
| Example B7 | $Ru/TiO_2$ | $TiO_2$ | Ru: 1.2 | 64.7 | 0.71 |
| Example B8 | $Ru/Al_2O_3$ | $Al_2O_3$ | Ru: 2.3 | 114.5 | 0.97 |
| Example B9 | $Ru/Mo/Al_2O_3$ | $Al_2O_3$ | Ru: 1.4, Mo: 1.5 | 131.4 | 0.47 |
| Example B10 | $Ru/V/Al_2O_3$ | $Al_2O_3$ | Ru: 1.2, V: 2.1 | 108.3 | 0.45 |
| Example B11 | $Ru/Mo/Al_2O_3$ | $Al_2O_3$ | Ru: 2.5, Mo: 1.7 | 115.5 | 1.24 |
| Example B12 | $Ru/V/ZrO_2$ | $ZrO_2$ | Ru: 1.1, V: 1.4 | 46.4 | 0.62 |
| Example B13 | $Ru/V/Al_2O_3$ | $Al_2O_3$ | Ru: 1.2, V: 3.9 | 118.0 | 0.63 |
| Example B14 | $Ru/V/TiO_2$ | $TiO_2$ | Ru: 1.2, V: 1.4 | 57.2 | 1.19 |
| Example B15 | $Ru/Mo/TiO_2$ | $TiO_2$ | Ru: 1.2, Mo: 1.2 | 58.1 | 1.21 |
| Example B16 | $Ni/Al_2O_3$ | $Al_2O_3$ | Ni: 13.0 | 95.7 | 0.01 |

TABLE 10

| | Catalyst | Indicator | Reaction temperature (° C.) | | | | | | | | | |
|---|---|---|---|---|---|---|---|---|---|---|---|---|
| | | | 233 | 249 | 257 | 273 | 274 | 276 | 277 | 278 | 287 | 289 |
| Example B4 | $Ru/Al_2O_3$ | Hydrocarbon conversion rate (%) | | | | | | | | | | |
| | | $CO_2$ removal assumed hydrocarbon conversion rate (%) | | | | | | | | | | |
| Example B5 | $Ru/SiO_2$ | Hydrocarbon conversion rate (%) | | | | | | | | | | |
| | | $CO_2$ removal assumed hydrocarbon conversion rate (%) | | | | | | | | | | |
| Example B6 | Ru/MgO | Hydrocarbon conversion rate (%) | | | | | | | | 4.2 | | |
| | | $CO_2$ removal assumed hydrocarbon conversion rate (%) | | | | | | | | 78.0 | | |

TABLE 10-continued

| Example | Catalyst | Metric | | | | |
|---|---|---|---|---|---|---|
| Example B7 | Ru/TiO$_2$ | Hydrocarbon conversion rate (%) | | | 64.2 | |
| | | CO$_2$ removal assumed hydrocarbon conversion rate (%) | | | 99.9 | |
| Example B8 | Ru/Al$_2$O$_3$ | Hydrocarbon conversion rate (%) | | | | 88.4 |
| | | CO$_2$ removal assumed hydrocarbon conversion rate (%) | | | | 100.0 |
| Example B9 | Ru/Mo/Al$_2$O$_3$ | Hydrocarbon conversion rate (%) | 14.2 | 74.6 | | |
| | | CO$_2$ removal assumed hydrocarbon conversion rate (%) | 99.8 | 100.0 | | |
| Example B10 | Ru/V/Al$_2$O$_3$ | Hydrocarbon conversion rate (%) | | 74.4 | | |
| | | CO$_2$ removal assumed hydrocarbon conversion rate (%) | | 100.0 | | |
| Example B11 | Ru/Mo/Al$_2$O$_3$ | Hydrocarbon conversion rate (%) | | 87.1 | | |
| | | CO$_2$ removal assumed hydrocarbon conversion rate (%) | | 100.0 | | |
| Example B12 | Ru/V/ZrO$_2$ | Hydrocarbon conversion rate (%) | | | | 87.8 |
| | | CO$_2$ removal assumed hydrocarbon conversion rate (%) | | | | 100.0 |
| Example B13 | Ru/V/Al$_2$O$_3$ | Hydrocarbon conversion rate (%) | | | 78.8 | |
| | | CO$_2$ removal assumed hydrocarbon conversion rate (%) | | | 99.9 | |
| Example B14 | Ru/V/TiO$_2$ | Hydrocarbon conversion rate (%) | | | | |
| | | CO$_2$ removal assumed hydrocarbon conversion rate (%) | | | | |
| Example B15 | Ru/Mo/TiO$_2$ | Hydrocarbon conversion rate (%) | | | | 75.2 |
| | | CO$_2$ removal assumed hydrocarbon conversion rate (%) | | | | 99.8 |

TABLE 10-continued

| Example B16 | Ni/Al$_2$O$_3$ | Hydrocarbon conversion rate (%) | | | | | | |
| | | CO$_2$ removal assumed hydrocarbon conversion rate (%) | | | | | | |

| | | | | Reaction temperature (° C.) | | | | | |
| | Catalyst | Indicator | 299 | 302 | 308 | 309 | 317 | 331 |
| --- | --- | --- | --- | --- | --- | --- | --- | --- |
| Example B4 | Ru/Al$_2$O$_3$ | Hydrocarbon conversion rate (%) | 78.6 | | | 80.8 | | 82.0 |
| | | CO$_2$ removal assumed hydrocarbon conversion rate (%) | 99.9 | | | 99.9 | | 99.9 |
| Example B5 | Ru/SiO$_2$ | Hydrocarbon conversion rate (%) | | 3.7 | | | | |
| | | CO$_2$ removal assumed hydrocarbon conversion rate (%) | | 46.9 | | | | |
| Example B6 | Ru/MgO | Hydrocarbon conversion rate (%) | | | | | | |
| | | CO$_2$ removal assumed hydrocarbon conversion rate (%) | | | | | | |
| Example B7 | Ru/TiO$_2$ | Hydrocarbon conversion rate (%) | | | | | | |
| | | CO$_2$ removal assumed hydrocarbon conversion rate (%) | | | | | | |
| Example B8 | Ru/Al$_2$O$_3$ | Hydrocarbon conversion rate (%) | | | | | | |
| | | CO$_2$ removal assumed hydrocarbon conversion rate (%) | | | | | | |
| Example B9 | Ru/Mo/Al$_2$O$_3$ | Hydrocarbon conversion rate (%) | | | | | | |
| | | CO$_2$ removal assumed hydrocarbon conversion rate (%) | | | | | | |
| Example B10 | Ru/V/Al$_2$O$_3$ | Hydrocarbon conversion rate (%) | | | | | | |
| | | CO$_2$ removal assumed hydrocarbon conversion rate (%) | | | | | | |
| Example B11 | Ru/Mo/Al$_2$O$_3$ | Hydrocarbon conversion rate (%) | | | | | | |
| | | CO$_2$ removal assumed hydrocarbon conversion rate (%) | | | | | | |
| Example B12 | Ru/V/ZrO$_2$ | Hydrocarbon conversion rate (%) | | | | | | |

TABLE 10-continued

| Example | Catalyst | Indicator | Value |
|---|---|---|---|
| Example B13 | Ru/V/Al$_2$O$_3$ | CO$_2$ removal assumed hydrocarbon conversion rate (%) | |
| | | Hydrocarbon conversion rate (%) | |
| | | CO$_2$ removal assumed hydrocarbon conversion rate (%) | |
| Example B14 | Ru/V/TiO$_2$ | Hydrocarbon conversion rate (%) | 81.7 |
| | | CO$_2$ removal assumed hydrocarbon conversion rate (%) | 99.9 |
| Example B15 | Ru/Mo/TiO$_2$ | Hydrocarbon conversion rate (%) | |
| | | CO$_2$ removal assumed hydrocarbon conversion rate (%) | |
| Example B16 | Ni/Al$_2$O$_3$ | Hydrocarbon conversion rate (%) | 26.7 |
| | | CO$_2$ removal assumed hydrocarbon conversion rate (%) | 96.2 |

(Evaluation Test 3)

In the evaluation test 3, a mixed gas (H$_2$/CO=3) containing H$_2$ and CO in a ratio of 3:1 (volume ratio) was used as the reaction gas, the GHSV was set to 4000/h, and the activity test of the hydrocarbon synthesis catalyst cat2 was carried out at the reaction temperature of 235° C. to about 330° C. In this activity test, a catalyst (Examples B17 and B18) in which iron or cobalt was supported on a titania carrier in addition to ruthenium was used. In this case, the reaction gas is an example obtained by assuming a model in which a mixed gas obtained by adding carbon monoxide to hydrogen obtained by electrolyzing water in the electrolysis reaction unit 10, and a mixed gas of hydrogen and carbon monoxide obtained by separating water and carbon dioxide as needed from the gas obtained by carrying out a co-electrolysis reaction of water and carbon dioxide are introduced into the hydrocarbon synthesis reaction unit 30 to carry out the hydrocarbon synthesis reaction.

The results of the evaluation test 3 are illustrated in Table 11.

TABLE 11

| | Catalyst | Indicator | Reaction temperature (° C.) | | | |
|---|---|---|---|---|---|---|
| | | | 235 | 250 | 278 | 327 |
| Example B17 | 2 wt. % Ru/ 2 wt. % Fe/ TiO$_2$ | CO$_2$ removal assumed hydrocarbon conversion rate (%) | 11.6 | | 99.9 | 99.9 |
| | | C$_1$-C$_4$ calorific value (MJ/Nm$^3$) | 59.0 | | 47.1 | 42.16 |
| Example B18 | 2 wt. % Ru/ 2 wt. % Co/ TiO$_2$ | CO$_2$ removal assumed hydrocarbon conversion rate (%) | | 99.0 | | |
| | | C$_1$-C$_4$ calorific value (MJ/Nm$^3$) | | 46 | | |

As illustrated in Table 11, it was confirmed that hydrocarbons can be synthesized from a mixed gas containing $H_2$ and CO using a catalyst in which ruthenium and iron or cobalt are supported on a titania carrier as a hydrocarbon synthesis catalyst cat2.

It was confirmed that the above-mentioned hydrocarbon production system 100 can generate a high-calorie gas having a C1-C4 calorific value of 39 $MJ/Nm^3$ or more.

From the above results, as illustrated above, a catalyst in which at least ruthenium is supported as the catalytically active component ca2 on the metal oxide carrier cb2 can be used in the second catalytic reaction unit 30 (hydrocarbon synthesis reaction unit). Further, it is preferable to support at least one of molybdenum, vanadium, iron, and cobalt as the catalytically active component ca2.

It was found that, preferably, the hydrocarbon synthesis catalyst cat2 was a catalyst in which at least ruthenium was supported on the metal oxide carrier cb2, the supported amount of ruthenium was 0.1% by weight or more and 5% by weight or less, and at least one of molybdenum, vanadium, iron, and cobalt as the catalytically active component ca2 was supported on the metal oxide carrier cb2 in addition to ruthenium.

Here, the supported amount of at least one of the molybdenum, vanadium, iron, and cobalt can be 0.2% by weight or more and 6% by weight or less.

Further, in hydrocarbon synthesis catalysts cat2, the adsorption amount of carbon monoxide of the highly active catalyst was 0.4 ml/g or more.

[Heavy Hydrocarbon Separation Unit]

When the gas reaching the heavy hydrocarbon separation unit 35 is cooled, the heavy hydrocarbons contained in the gas released from the hydrocarbon synthesis reaction unit 30 are condensed and the heavy hydrocarbons can be taken out to the outside. For example, in the hydrocarbon synthesis reaction unit 30 using the 2 wt. % Ru/2 wt. % $Fe/TiO_2$ catalyst illustrated in Example B17, when a mixed gas ($H_2/CO=3$) containing $H_2$ and CO in a ratio of 3:1 (volume ratio) was introduced and the reaction was carried out at 275° C., a linear higher aliphatic hydrocarbon having an average chain length of 26 carbon atoms could be extracted from the heavy hydrocarbon separation unit 35. Moreover, when the reaction was carried out at 325° C., a linear higher aliphatic hydrocarbon having an average chain length of 18 carbon atoms could be extracted from the heavy hydrocarbon separation unit 35.

[Water Separation Unit]

A condenser is arranged in the water separation unit 40, and the gas containing $H_2O$ flowing in is adjusted to a predetermined temperature and pressure to be condensed and water is taken out to the outside.

[Carbon Dioxide Separation Unit]

For example, PSA is arranged in this unit 50, and the gas containing $CO_2$ flowing in is adsorbed to the adsorbent under a predetermined temperature and pressure to separate $CO_2$, the separated $CO_2$ is separated from the adsorbent, and thus, $CO_2$ is favorably separated. The separated $CO_2$ can be returned to the front of the electrolysis reaction unit 10 and reused via the carbon dioxide return path 51.

It is also possible to use PSA or the like to make the carbon dioxide separation unit and the water separation unit the same separation unit.

Figure 7:
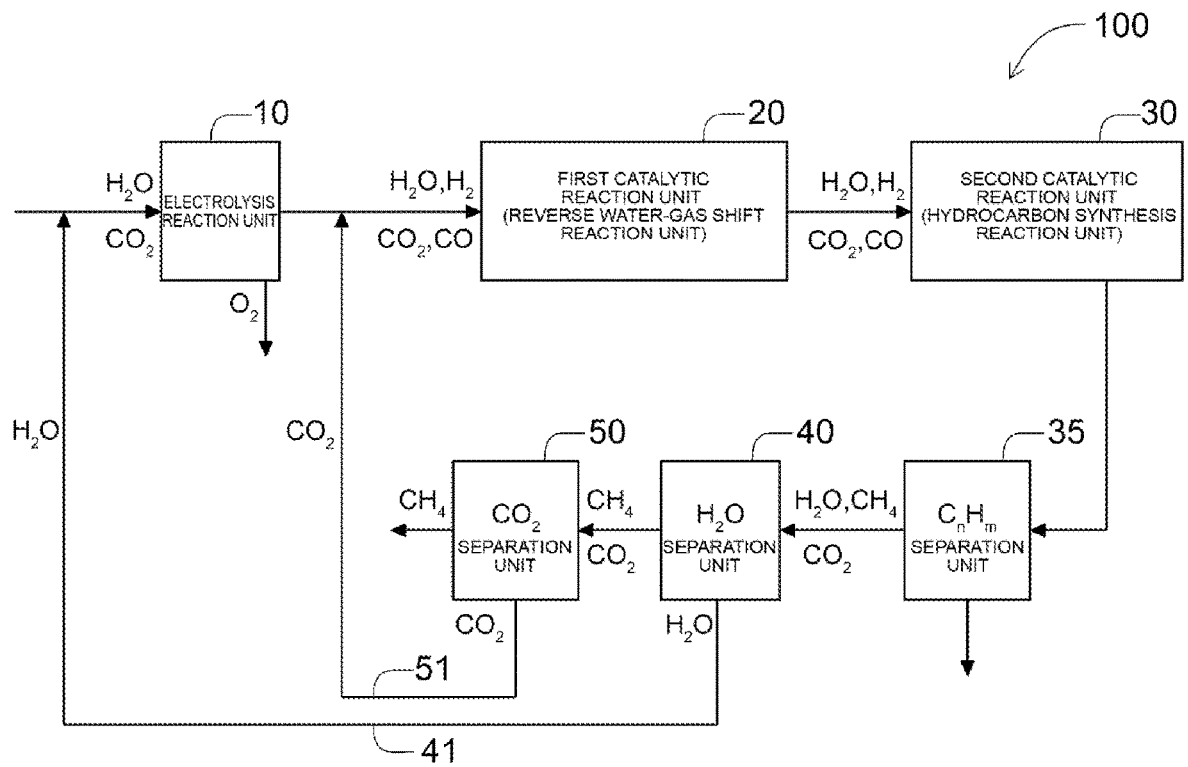
FIG. 7 is a diagram illustrating another configuration of a hydrocarbon production system that guides $CO_2$ to the reverse water-gas shift reaction unit.

Another Embodiment (1) In the above embodiment, $CO_2$ separated in the carbon dioxide separation unit 50 is returned to the front of the electrolysis reaction unit 10. However, in the hydrocarbon production system 100 according to the present invention, since the conversion of $CO_2$ to CO is mainly performed by the reverse water-gas shift reaction unit 20, a return destination of $CO_2$ may be in front of the reverse water-gas shift reaction unit 20. This configuration is illustrated in FIG. 7.

Figure 8:
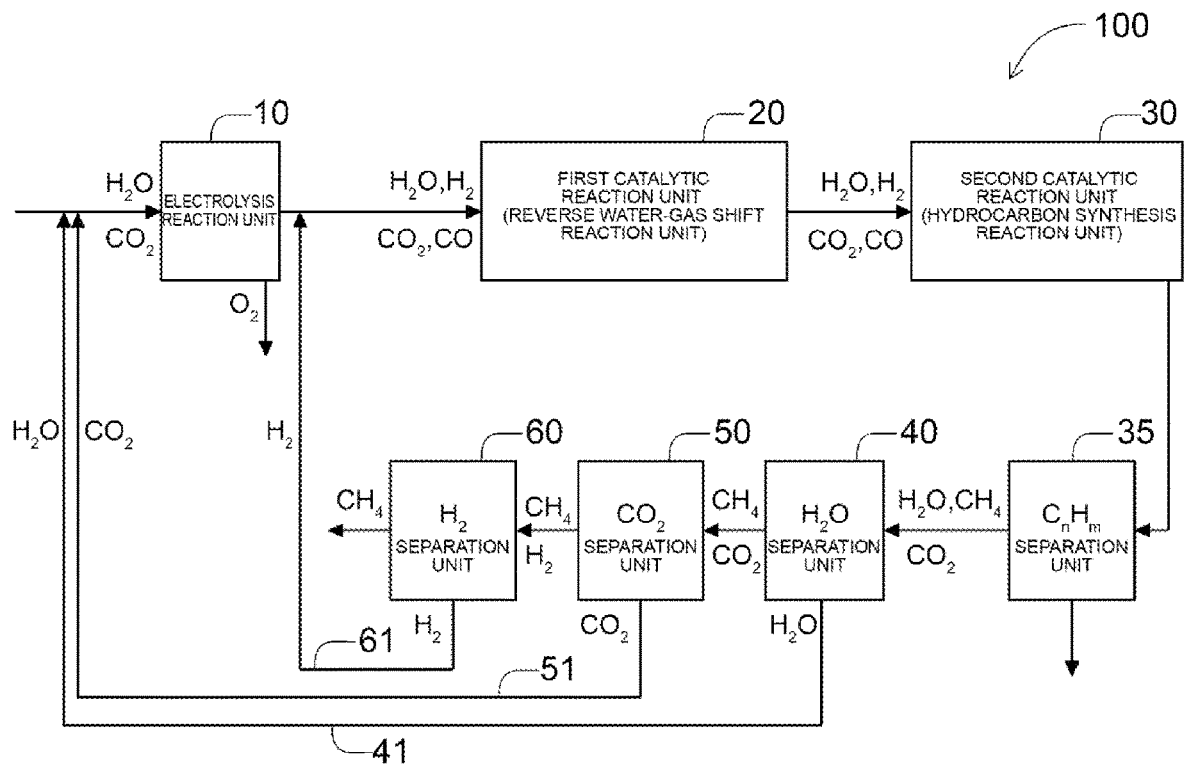
FIG. 8 is a diagram illustrating another configuration of the hydrocarbon production system equipped with the hydrogen separation unit.

(2) In the above embodiment, $H_2$ in the gas obtained from the hydrocarbon synthesis reaction unit 30 is not particularly described. However, a hydrogen separation unit (described as $H_2$ separation unit in the drawing) 60 that separates $H_2$ using a hydrogen separation membrane or the like may be provided to separate $H_2$ and use $H_2$ separately. This configuration is illustrated in FIG. 8. In this example, the return destination of $H_2$ separated by the hydrogen separation unit 60 may be provided in front of the reverse water-gas shift reaction unit 20 so that $H_2$ is used for the reverse water-gas shift reaction.

Figure 9:
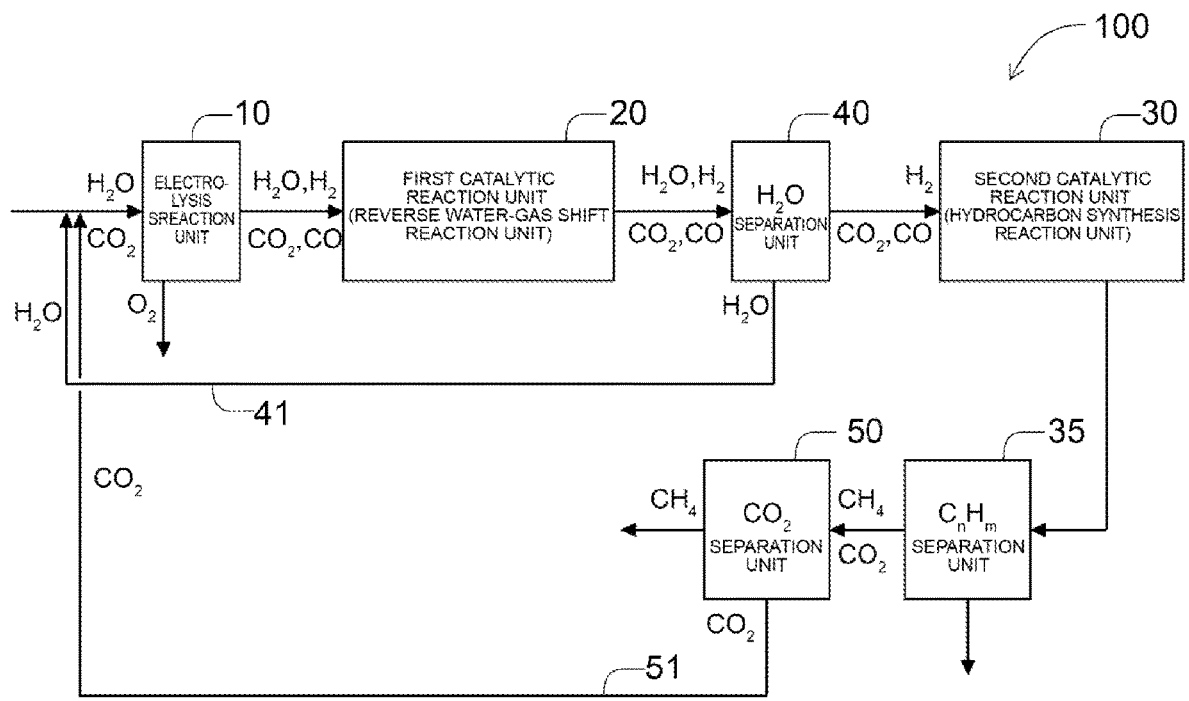
FIG. 9 is a diagram illustrating still another configuration of a hydrocarbon production system equipped with the water separation unit in front of a hydrocarbon synthesis reaction unit.

(3) In the above embodiment, the water separation unit 40 is provided on the lower side of the hydrocarbon synthesis reaction unit 30. However, as illustrated in FIG. 9, the water separation unit 40 may be provided between the reverse water-gas shift reaction unit 20 and the hydrocarbon synthesis reaction unit 30. The main function of the water separation unit 40 is to facilitate the hydrocarbon synthesis reaction.

Figure 10:
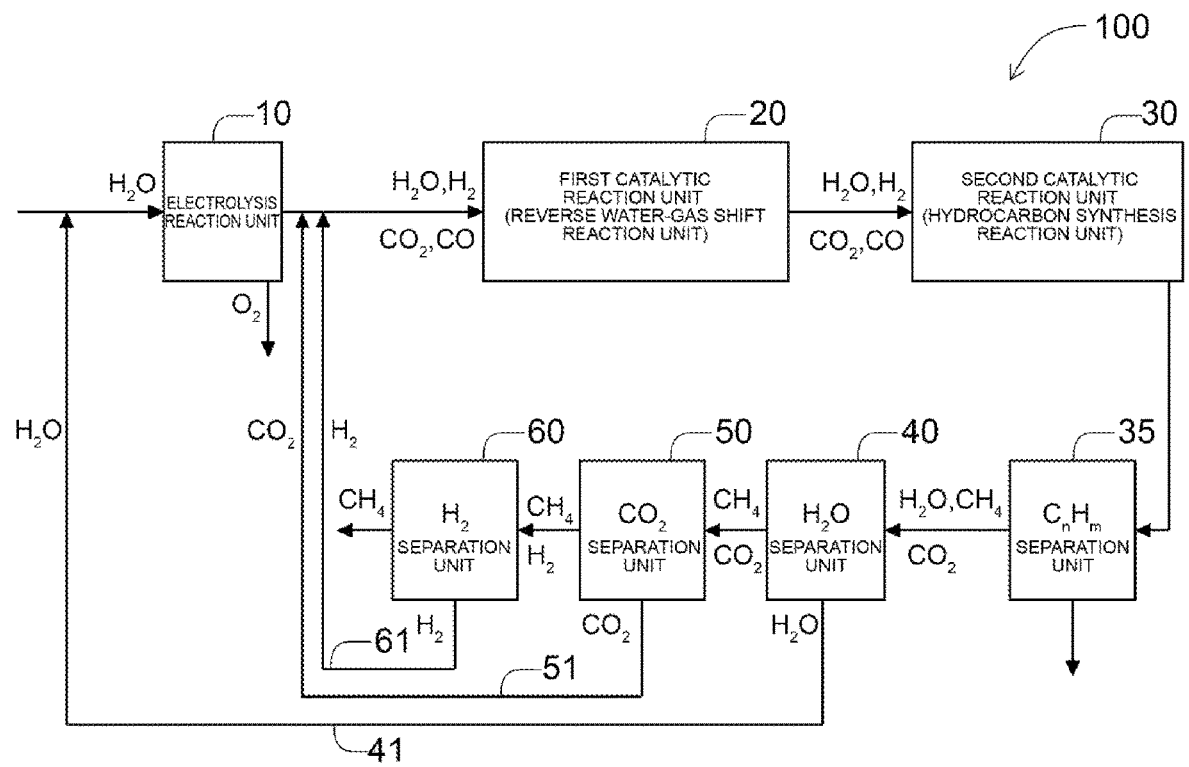
FIG. 10 is a diagram illustrating still another configuration of a hydrocarbon production system in which only water is introduced into the electrolysis reaction unit.

(4) In the above embodiment, an example in which both $H_2O$ and $CO_2$ are supplied to the electrolysis reaction unit 10 and subjected to the electrolysis reaction is illustrated. However, as illustrated in FIG. 10, a system may be used in which only $H_2O$ is supplied to the electrolysis reaction unit 10 to be subjected to the electrolysis reaction. In this case, the carbon consumed in the hydrocarbon synthesis is input to the reverse water-gas shift reaction unit 20 as carbon dioxide.

(5) In the above embodiment, an example in which a solid oxide type electrolysis cell is used as the electrolysis cell 1 in the electrolysis reaction unit 10 is illustrated. However, as the electrolysis cell 1, an alkaline type electrolysis cell, a polymer film type electrolysis cell, or the like may be used.

Figure 13:
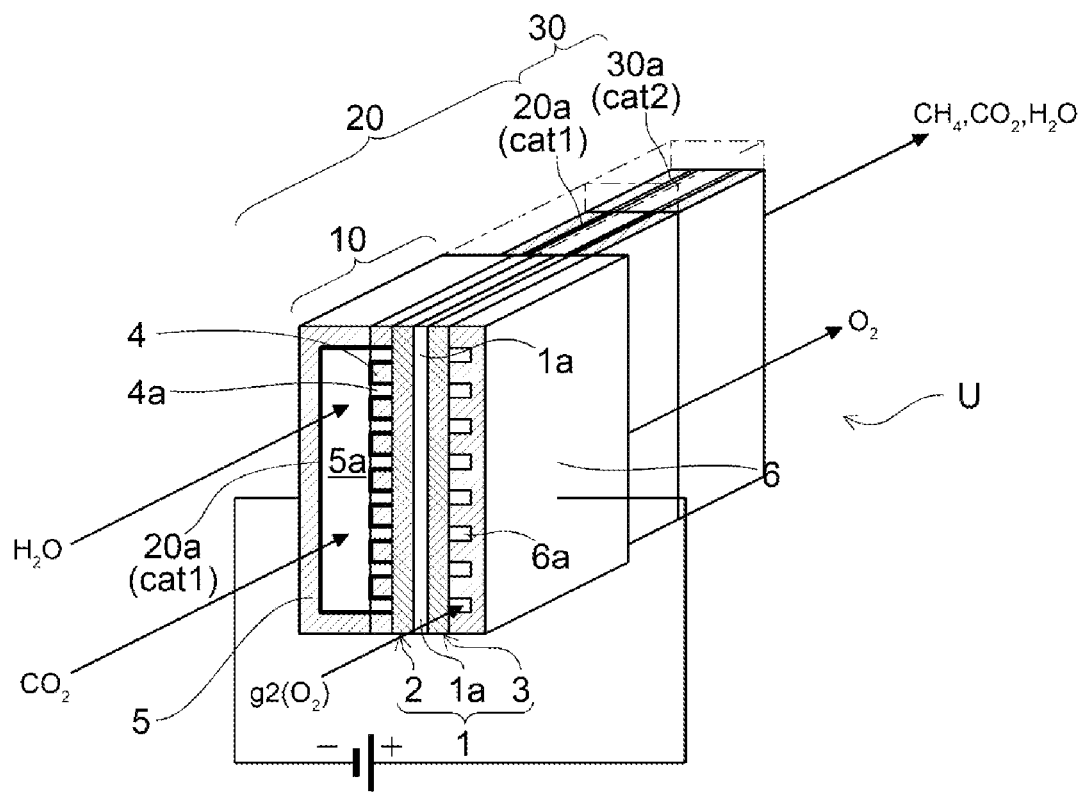
FIG. 13 is a schematic diagram of an electrolysis cell unit including the electrolysis reaction unit, the reverse water-gas shift reaction unit, and the hydrocarbon synthesis reaction unit.

(6) In the above embodiment, the electrolysis reaction unit 10 and the first catalytic reaction unit 20 are integrated. However, in addition to the reaction units 10.20, the second catalytic reaction unit 30 may be integrated. A configuration example in this case is illustrated in FIG. 13. Incidentally, in FIG. 13, a reference numeral 30a indicates a coating layer of the hydrocarbon synthesis catalyst cat2.

Also, in the case of this configuration, each of the reaction units 10, 20, and 30 can be configured on the metal support 4 and the supply path forming member 5, and the metal support 4 is supposed to act as a separator for separating the generated hydrocarbon and oxygen.

(7) In the above embodiment, an example of synthesizing a hydrocarbon such as methane in the hydrocarbon synthesis reaction unit 30 is illustrated. However, depending on how the hydrocarbon synthesis catalyst used in the hydrocarbon synthesis reaction unit 30 is selected, it is also possible to synthesize a chemical raw material from hydrogen and carbon monoxide introduced into the hydrocarbon synthesis reaction unit 30.

REFERENCE SIGNS LIST

1: Electrolysis cell
1a: Electrolyte layer
2: Electrode layer
3: Counter electrode layer
4: Metal support (support/separator)

4a Hole (through hole)
5: Supply path forming member (separator)
6: Supply path forming member (separator)
10: Electrolysis reaction unit
20: First catalytic reaction unit (reverse water-gas shift reaction unit)
20a: Coating layer
30: Second catalytic reaction unit (hydrocarbon synthesis reaction unit)
40: Water separation unit
50: Carbon dioxide separation unit
60: Hydrogen separation unit
U: Electrolysis cell unit
cat1: Reverse water-gas shift catalyst
ca1: Catalytically active component
cb1: Carrier
cat2: Hydrocarbon synthesis catalyst
ca2: Catalytically active component
cb2: Carrier

The invention claimed is:

1. An electrolysis cell unit comprising at least:
an electrolysis cell in which an electrode layer and a counter electrode layer are formed with an electrolyte layer interposed therebetween; and
a discharge path configured to discharge hydrogen generated in the electrode layer,
wherein the electrolysis cell is formed with the electrode layer having a thickness of 1 to 100 µm on one surface of a support,
wherein a gas flow path is provided along another surface of the support,
wherein a plurality of through holes are provided to penetrate the support from the one surface to the other surface of the support,
wherein the gas flow path forms an electrode layer-side gas supply path configured to supply water and carbon dioxide to the electrode layer and the gas flow path acts as the discharge path configured to discharge the hydrogen generated in the electrode layer, and
wherein a reverse water-gas shift reaction unit, configured to generate carbon monoxide using the carbon dioxide and the hydrogen by a reverse water-gas shift reaction, is provided in at least a portion of the discharge path.

2. The electrolysis cell unit according to claim 1, wherein the support is a metal.

3. The electrolysis cell unit according to claim 1, wherein the reverse water-gas shift reaction unit is provided in at least a portion of an inside of the plurality of through holes.

4. The electrolysis cell unit according to claim 1, wherein the reverse water-gas shift reaction unit is provided on a surface of the support different from a surface on which the electrolysis cell is formed.

5. The electrolysis cell unit according to claim 1, further comprising a separator that separates hydrogen generated in the electrode layer and oxygen generated in the counter electrode layer,
wherein the reverse water-gas shift reaction unit is provided in at least a portion of the separator on a discharge path side of the hydrogen.

6. The electrolysis cell unit according to claim 5, wherein the separator is a metal.

7. The electrolysis cell unit according to claim 1, wherein a reverse water-gas shift catalyst contained in the reverse water-gas shift reaction unit is a catalyst in which a metal or a metal oxide is supported on a carrier.

8. The electrolysis cell unit according to claim 1, wherein a reverse water-gas shift catalyst contained in the reverse water-gas shift reaction unit is a catalyst containing at least one of platinum, nickel, and iron.

9. The electrolysis cell unit according to claim 7, wherein the carrier is a carrier containing a ceria-based metal oxide or a zirconia-based metal oxide as a main component.

10. An electrolysis cell device comprising:
the electrolysis cell unit according to claim 1;
an electrolysis raw material supply unit that supplies water and/or steam and carbon dioxide to the electrolysis cell unit; and
a power supply unit that supplies electric power.

11. A hydrocarbon production system comprising:
the electrolysis cell unit according to claim 1; and
a hydrocarbon synthesis reaction unit that generates a hydrocarbon by at least reacting the hydrogen with the carbon monoxide.

12. A hydrocarbon production system comprising:
the electrolysis cell device according to claim 10; and
a hydrocarbon synthesis reaction unit that generates a hydrocarbon by at least reacting the hydrogen with the carbon monoxide.

* * * * *